(12) United States Patent
Williams, Jr. et al.

(10) Patent No.: US 8,925,954 B2
(45) Date of Patent: Jan. 6, 2015

(54) HITCH APPARATUS FOR VEHICLES

(75) Inventors: Thomas M. Williams, Jr., Durham, NC (US); Gregory S. Hopper, Raleigh, NC (US); David Allen DeKarske, Waterford, MI (US)

(73) Assignee: TeleSwivel, LLC, Durham, NC (US)

( * ) Notice: Subject to any disclaimer, the term of this patent is extended or adjusted under 35 U.S.C. 154(b) by 994 days.

(21) Appl. No.: 12/952,889

(22) Filed: Nov. 23, 2010

(65) Prior Publication Data
US 2011/0221164 A1 Sep. 15, 2011

Related U.S. Application Data

(60) Provisional application No. 61/312,056, filed on Mar. 9, 2010.

(51) Int. Cl.
*B60D 1/36* (2006.01)
*B60D 1/40* (2006.01)
*B60D 1/01* (2006.01)

(52) U.S. Cl.
CPC ... *B60D 1/01* (2013.01); *B60D 1/36* (2013.01)
USPC ............ 280/477; 280/478.1; 280/479.2; 280/479.3

(58) Field of Classification Search
CPC ............ B60D 1/36; B60D 1/363; B60D 1/40; B60D 1/42; B60D 1/44; B60D 1/155
USPC ............... 280/456.1, 467, 477, 478.1, 479.2, 280/479.3, 491.1, 491.2, 493, 494, 495, 498
See application file for complete search history.

(56) References Cited

U.S. PATENT DOCUMENTS

| | | |
|---|---|---|
| 2,988,383 A | 6/1961 | Carson |
| 3,057,644 A | 10/1962 | Fisher |
| 3,093,395 A | 6/1963 | Boutwell |
| 3,140,881 A | 7/1964 | Antici |
| 3,169,028 A | 2/1965 | Scrivner |
| 3,169,782 A | 2/1965 | Columbus |
| 3,207,530 A | 9/1965 | Paun |

(Continued)

OTHER PUBLICATIONS

International Preliminary Report on Patentability Corresponding to International Application No. PCT/US2010/060959; Date of Mailing: Sep. 20, 2012; 7 Pages.

(Continued)

*Primary Examiner* — Joseph Rocca
*Assistant Examiner* — Marc A Scharich
(74) *Attorney, Agent, or Firm* — Myers Bigel Sibley & Sajovec

(57) ABSTRACT

A hitch apparatus includes a housing and a tow bar movably disposed within the housing. The housing includes spaced-apart first and second sections. The first section includes an elongated slot formed through a portion thereof. A tow bar guide is attached to an interior side of the first section and includes an elongated opening formed therethrough with opposite first and second portions. The tow bar includes a first guide member that extends outwardly from the tow bar at the proximal end thereof, and a second guide member that extends outwardly from a medial portion of the tow bar. The first guide member extends through the first portion of the elongated opening in the tow bar guide and is operably engaged with the slot in the first section. The second guide member is operably engaged with the second portion of the elongated opening in the tow bar guide.

59 Claims, 14 Drawing Sheets

(56) References Cited

U.S. PATENT DOCUMENTS

| | | | |
|---|---|---|---|
| 3,243,202 A | 3/1966 | Carson | |
| 3,279,825 A | 10/1966 | Boutwell | |
| 3,400,949 A | 9/1968 | Kendall | |
| 3,410,577 A | 11/1968 | Luinstra | |
| 3,596,925 A | 8/1971 | Richie | |
| 3,659,875 A | 5/1972 | Masar | |
| 3,675,947 A | 7/1972 | Blagg | |
| 3,677,565 A * | 7/1972 | Slosiarek | 280/499 |
| 3,700,053 A | 10/1972 | Glissendorf | |
| 3,702,029 A | 11/1972 | Anderson, Jr. | |
| 3,720,000 A | 3/1973 | Schlegel | |
| 3,734,539 A | 5/1973 | Salmi | |
| 3,740,077 A | 6/1973 | Williams | |
| 3,747,958 A | 7/1973 | Hackett | |
| 3,767,230 A | 10/1973 | DeVries | |
| 3,773,356 A | 11/1973 | Eichels et al. | |
| 3,774,149 A | 11/1973 | Bennett | |
| 3,807,767 A | 4/1974 | Moline | |
| 3,818,599 A | 6/1974 | Tague | |
| 3,833,243 A | 9/1974 | Hanson | |
| 3,858,966 A | 1/1975 | Lowell, Jr. | |
| 3,867,898 A | 2/1975 | Lakamp | |
| 3,879,062 A | 4/1975 | Miller | |
| 3,881,748 A | 5/1975 | Donaldson | |
| 3,889,384 A | 6/1975 | White | |
| 3,891,237 A | 6/1975 | Allen | |
| 3,891,238 A | 6/1975 | Ehlert | |
| 3,901,536 A | 8/1975 | Black | |
| 3,909,033 A | 9/1975 | Russell, Jr. | |
| RE28,590 E | 10/1975 | Salmi | |
| 3,912,119 A | 10/1975 | Hill et al. | |
| 3,912,302 A | 10/1975 | Patterson | |
| 3,918,746 A | 11/1975 | Lehtisaari | |
| 3,922,006 A | 11/1975 | Borges | |
| 3,924,257 A | 12/1975 | Roberts | |
| 3,929,237 A | 12/1975 | Schaedler | |
| 3,944,259 A | 3/1976 | Miller | |
| 3,961,677 A | 6/1976 | Geisthoff | |
| 3,964,767 A | 6/1976 | Williams | |
| 3,966,231 A | 6/1976 | Metzler | |
| 4,012,056 A | 3/1977 | Christensen | |
| 4,030,775 A | 6/1977 | Hill | |
| 4,054,302 A | 10/1977 | Campbell | |
| 4,057,266 A | 11/1977 | Duncan et al. | |
| 4,065,147 A | 12/1977 | Ross | |
| 4,078,774 A | 3/1978 | Williams | |
| 4,131,295 A | 12/1978 | Highberger | |
| 4,131,296 A | 12/1978 | Strader | |
| 4,134,602 A | 1/1979 | Boger | |
| 4,156,972 A | 6/1979 | Vankrevelen | |
| 4,169,610 A | 10/1979 | Paufler | |
| 4,173,353 A | 11/1979 | Steele | |
| 4,178,011 A | 12/1979 | Kirsch | |
| 4,186,939 A | 2/1980 | Woods et al. | |
| 4,187,494 A | 2/1980 | Jessee | |
| 4,192,526 A | 3/1980 | Myers | |
| 4,205,453 A | 6/1980 | Steele | |
| 4,225,149 A | 9/1980 | Koopman | |
| 4,226,438 A | 10/1980 | Collins | |
| 4,254,968 A | 3/1981 | DelVecchio | |
| 4,254,969 A | 3/1981 | Martin | |
| 4,265,465 A | 5/1981 | Deitrich, Sr. | |
| 4,269,428 A | 5/1981 | Rexine | |
| 4,313,264 A | 2/1982 | Miller, Sr. | |
| 4,416,466 A | 11/1983 | Park | |
| 4,417,748 A | 11/1983 | Dortch | |
| 4,431,208 A | 2/1984 | Geeves | |
| 4,432,563 A | 2/1984 | Pitcher | |
| 4,484,760 A | 11/1984 | Rach | |
| 4,511,159 A | 4/1985 | Younger | |
| 4,515,387 A | 5/1985 | Schuck | |
| 4,537,416 A | 8/1985 | Linaburg | |
| 4,545,595 A | 10/1985 | Gray | |
| 4,552,376 A | 11/1985 | Cofer | |
| 4,560,183 A | 12/1985 | Cook | |
| 4,560,184 A | 12/1985 | Williams, Jr. | |
| 4,583,481 A | 4/1986 | Garrison | |
| 4,603,878 A | 8/1986 | Smith, Jr. | |
| 4,606,549 A | 8/1986 | Williams, Jr. | |
| 4,613,149 A | 9/1986 | Williams, Jr. | |
| 4,614,356 A | 9/1986 | Mills | |
| 4,621,432 A | 11/1986 | Law | |
| 4,627,634 A | 12/1986 | Coleman | |
| 4,650,207 A | 3/1987 | Ackermann | |
| 4,657,275 A | 4/1987 | Carroll | |
| 4,657,276 A | 4/1987 | Hamerl | |
| 4,666,176 A | 5/1987 | Sand | |
| 4,666,177 A | 5/1987 | Vinchattle | |
| 4,674,942 A | 6/1987 | Assh et al. | |
| 4,687,220 A | 8/1987 | Danielson | |
| 4,708,359 A | 11/1987 | Davenport | |
| 4,759,564 A | 7/1988 | Williams, Jr. | |
| 4,772,040 A | 9/1988 | Klemm | |
| 4,781,394 A | 11/1988 | Schwarz et al. | |
| 4,792,151 A | 12/1988 | Feld | |
| 4,799,705 A | 1/1989 | Janes et al. | |
| 4,802,686 A | 2/1989 | Isreal | |
| 4,807,714 A | 2/1989 | Blau et al. | |
| 4,807,899 A | 2/1989 | Belcher | |
| 4,811,965 A | 3/1989 | Eubanks | |
| 4,840,392 A | 6/1989 | Baskett | |
| 4,844,496 A | 7/1989 | Webb et al. | |
| 4,844,497 A | 7/1989 | Allen | |
| 4,852,901 A | 8/1989 | Beasley et al. | |
| 4,854,604 A | 8/1989 | Stallsworth | |
| 4,861,061 A | 8/1989 | Frantz | |
| 4,871,184 A | 10/1989 | Johnson | |
| 4,871,185 A | 10/1989 | Chakroff et al. | |
| 4,903,978 A | 2/1990 | Schrum, III | |
| 4,905,376 A | 3/1990 | Neeley | |
| 4,913,451 A | 4/1990 | Woodall | |
| 4,938,495 A | 7/1990 | Beasley et al. | |
| 4,944,525 A | 7/1990 | Landry | |
| 4,951,957 A | 8/1990 | Gullickson | |
| 4,953,883 A | 9/1990 | Helie | |
| 4,958,436 A | 9/1990 | Tusche | |
| 4,961,589 A | 10/1990 | Faurenhoff | |
| 4,961,590 A | 10/1990 | Davenport | |
| 4,974,866 A | 12/1990 | Morgan | |
| 4,976,453 A | 12/1990 | Kaplan | |
| 4,988,116 A | 1/1991 | Evertsen | |
| 4,991,865 A | 2/1991 | Francisco | |
| 5,000,471 A | 3/1991 | Sumrall | |
| 5,005,852 A | 4/1991 | Smyly, Sr. | |
| 5,009,444 A | 4/1991 | Williams, Jr. | |
| 5,009,445 A | 4/1991 | Williams, Jr. | |
| 5,009,446 A | 4/1991 | Davis | |
| 5,016,900 A | 5/1991 | McCully | |
| 5,035,441 A | 7/1991 | Murray | |
| 5,036,593 A | 8/1991 | Collier | |
| 5,037,123 A | 8/1991 | Smith | |
| 5,048,854 A | 9/1991 | Clark | |
| 5,067,742 A | 11/1991 | Relja | |
| 5,080,386 A | 1/1992 | Lazar | |
| 5,085,408 A | 2/1992 | Norton et al. | |
| 5,108,123 A | 4/1992 | Rubenzik | |
| 5,113,588 A | 5/1992 | Walston | |
| 5,114,168 A | 5/1992 | Kehl | |
| 5,114,170 A | 5/1992 | Lanni et al. | |
| 5,115,572 A | 5/1992 | Harbison | |
| 5,161,815 A | 11/1992 | Penor, Jr. | |
| 5,180,182 A | 1/1993 | Haworth | |
| 5,188,385 A | 2/1993 | Wilson | |
| 5,191,328 A | 3/1993 | Nelson | |
| 5,195,769 A | 3/1993 | Williams, Jr. | |
| 5,201,539 A | 4/1993 | Mayfield | |
| 5,203,582 A | 4/1993 | Smyly, Sr. | |
| 5,213,354 A | 5/1993 | Vaughn | |
| 5,224,270 A | 7/1993 | Burrus | |
| 5,236,214 A | 8/1993 | Taylor | |
| 5,236,215 A | 8/1993 | Wylie | |
| 5,257,797 A | 11/1993 | Johnson | |
| 5,269,554 A | 12/1993 | Law et al. | |
| 5,277,446 A | 1/1994 | Hamel | |

(56) References Cited

U.S. PATENT DOCUMENTS

| | | |
|---|---|---|
| 5,277,447 A | 1/1994 | Blaser |
| 5,286,050 A | 2/1994 | Stallings, Jr. et al. |
| 5,288,095 A | 2/1994 | Swindall |
| 5,288,096 A | 2/1994 | Degelman |
| 5,290,056 A | 3/1994 | Fath, IV |
| 5,309,289 A | 5/1994 | Johnson |
| 5,316,330 A | 5/1994 | Bergeron |
| 5,322,315 A | 6/1994 | Carsten |
| 5,330,196 A | 7/1994 | Ricles |
| 5,335,930 A | 8/1994 | Tighe |
| 5,342,076 A | 8/1994 | Swindall |
| 5,348,329 A | 9/1994 | Morin et al. |
| 5,382,042 A | 1/1995 | McPhee et al. |
| 5,405,160 A | 4/1995 | Weaver |
| 5,413,369 A | 5/1995 | Trent |
| 5,454,582 A | 10/1995 | Rines |
| 5,461,471 A | 10/1995 | Sommerfeld |
| 5,465,992 A | 11/1995 | Anderson |
| 5,468,007 A | 11/1995 | Kanerva |
| 5,478,101 A | 12/1995 | Roberson |
| 5,482,310 A | 1/1996 | Staggs |
| 5,503,422 A | 4/1996 | Austin |
| 5,503,423 A | 4/1996 | Roberts et al. |
| 5,516,139 A | 5/1996 | Woods |
| 5,518,263 A | 5/1996 | Owens |
| 5,529,330 A | 6/1996 | Roman |
| 5,547,210 A | 8/1996 | Dugger |
| 5,558,352 A | 9/1996 | Mills |
| 5,580,088 A | 12/1996 | Griffith |
| 5,593,171 A | 1/1997 | Shields |
| 5,630,606 A * | 5/1997 | Ryan .................. 280/479.3 |
| 5,636,885 A | 6/1997 | Hummel |
| 5,657,175 A | 8/1997 | Brewington |
| 5,669,621 A | 9/1997 | Lockwood |
| 5,680,706 A | 10/1997 | Talcott |
| 5,725,232 A | 3/1998 | Fleming |
| 5,727,805 A * | 3/1998 | La Roque ............ 280/478.1 |
| 5,729,194 A | 3/1998 | Spears et al. |
| 5,758,893 A | 6/1998 | Schultz |
| 5,769,443 A | 6/1998 | Muzny |
| 5,779,256 A | 7/1998 | Vass |
| 5,784,213 A | 7/1998 | Howard |
| 5,797,616 A | 8/1998 | Clement |
| 5,806,196 A | 9/1998 | Gibbs et al. |
| 5,821,852 A | 10/1998 | Fairchild |
| 5,882,029 A | 3/1999 | Kennedy |
| 5,890,617 A | 4/1999 | Rowland et al. |
| 5,909,892 A | 6/1999 | Richardson |
| 5,927,229 A | 7/1999 | Karr, Jr. |
| 5,927,742 A | 7/1999 | Draper |
| 5,941,551 A | 8/1999 | Harman et al. |
| 5,951,035 A | 9/1999 | Phillips, Jr. et al. |
| 5,951,036 A | 9/1999 | Sargent |
| 5,979,927 A | 11/1999 | Hale |
| 5,992,871 A | 11/1999 | Rowland et al. |
| 6,042,136 A | 3/2000 | Heinecke |
| 6,068,281 A | 5/2000 | Szczypski |
| 6,076,847 A | 6/2000 | Thornton |
| 6,102,422 A | 8/2000 | Damron |
| 6,102,423 A | 8/2000 | Beck et al. |
| 6,120,052 A | 9/2000 | Capik et al. |
| 6,139,041 A | 10/2000 | Murphy |
| 6,168,181 B1 | 1/2001 | Gadd |
| 6,170,852 B1 | 1/2001 | Kimbrough |
| 6,176,505 B1 | 1/2001 | Capik et al. |
| 6,178,650 B1 | 1/2001 | Thibodeaux |
| 6,193,258 B1 | 2/2001 | Kennedy |
| 6,199,503 B1 | 3/2001 | Midgett |
| 6,209,902 B1 | 4/2001 | Potts |
| 6,213,608 B1 | 4/2001 | Osgood |
| 6,222,457 B1 | 4/2001 | Mills et al. |
| 6,234,510 B1 | 5/2001 | Hammons |
| 6,239,926 B1 | 5/2001 | De Shazer |
| 6,273,448 B1 | 8/2001 | Cross |
| 6,279,940 B1 | 8/2001 | Beavington |
| 6,286,851 B1 | 9/2001 | Sargent |
| 6,286,852 B1 | 9/2001 | Slatten |
| 6,299,191 B1 | 10/2001 | Sargent |
| 6,318,747 B1 | 11/2001 | Ratican |
| 6,341,794 B1 | 1/2002 | Hunter |
| 6,357,126 B1 | 3/2002 | Gillen, Jr. |
| 6,364,337 B1 | 4/2002 | Rowland et al. |
| 6,378,888 B1 | 4/2002 | Laurent |
| 6,382,653 B1 | 5/2002 | Bass |
| 6,386,514 B1 | 5/2002 | Ray |
| 6,386,572 B1 | 5/2002 | Cofer |
| 6,409,200 B1 | 6/2002 | Glass |
| 6,422,585 B1 | 7/2002 | Glass |
| 6,428,030 B2 | 8/2002 | Melesko et al. |
| 6,446,999 B1 | 9/2002 | Davis, Jr. |
| 6,454,290 B1 | 9/2002 | Turner |
| 6,478,325 B1 | 11/2002 | Knauff |
| 6,480,104 B1 | 11/2002 | Wall et al. |
| 6,517,098 B2 | 2/2003 | Grasso et al. |
| 6,540,247 B1 | 4/2003 | Perkins |
| 6,585,281 B1 | 7/2003 | Voorting |
| 6,612,603 B2 | 9/2003 | Alger |
| 6,619,685 B2 | 9/2003 | Teague |
| 6,637,718 B2 | 10/2003 | Wilson |
| 6,644,680 B1 | 11/2003 | Coe |
| 6,651,996 B1 | 11/2003 | Allemang |
| 6,663,133 B1 | 12/2003 | Rosenlund |
| 6,698,783 B1 | 3/2004 | Zechbauer |
| 6,712,378 B1 | 3/2004 | Austin |
| 6,726,236 B2 | 4/2004 | Cofer |
| 6,749,213 B2 | 6/2004 | Kollath et al. |
| 6,758,485 B1 | 7/2004 | Voelker et al. |
| 6,796,573 B2 | 9/2004 | Beaudoin |
| 6,811,175 B1 | 11/2004 | Keyser |
| 6,820,888 B1 | 11/2004 | Griffin |
| 6,824,156 B2 | 11/2004 | Smith |
| 6,827,363 B1 | 12/2004 | Amerson |
| 6,834,878 B2 | 12/2004 | Koestler |
| 6,851,697 B2 | 2/2005 | Kinnard |
| 6,860,502 B1 | 3/2005 | Bolten |
| 6,863,294 B1 | 3/2005 | Bonham |
| 6,874,804 B2 | 4/2005 | Reese et al. |
| 6,880,849 B2 | 4/2005 | Teague |
| 6,889,994 B1 | 5/2005 | Birkenbaugh |
| 6,900,724 B2 | 5/2005 | Johnson |
| 6,905,132 B2 | 6/2005 | Pierce |
| 6,916,109 B2 | 7/2005 | Julicher |
| 6,932,374 B1 | 8/2005 | Timms et al. |
| 6,948,733 B2 | 9/2005 | Webster et al. |
| 6,951,345 B2 | 10/2005 | Wilks |
| 6,976,694 B1 | 12/2005 | Rayl et al. |
| 7,004,488 B2 | 2/2006 | Reiter et al. |
| 7,007,967 B2 | 3/2006 | Goettker |
| 7,036,840 B2 | 5/2006 | Kwilinski |
| 7,097,193 B1 | 8/2006 | Sievert |
| 7,111,863 B2 | 9/2006 | Ward et al. |
| 7,131,658 B2 | 11/2006 | MacKarvich |
| 7,134,679 B2 | 11/2006 | Krstovic |
| 7,192,047 B2 | 3/2007 | Sauermann |
| 7,207,589 B2 | 4/2007 | Givens |
| 7,226,070 B1 | 6/2007 | Duncan |
| 7,232,145 B1 | 6/2007 | Reece et al. |
| 7,255,362 B2 * | 8/2007 | Smith .................. 280/490.1 |
| 7,264,260 B2 | 9/2007 | Overstreet |
| 7,290,755 B1 | 11/2007 | Thibodeaux |
| 7,293,791 B1 | 11/2007 | Williams, Jr. |
| 7,309,076 B2 | 12/2007 | Allen |
| 7,350,798 B1 | 4/2008 | Farrugia |
| 7,391,303 B2 | 6/2008 | Ball |
| 7,416,205 B1 | 8/2008 | Sam |
| 7,425,014 B1 | 9/2008 | Palmer |
| 7,431,318 B2 | 10/2008 | Frades |
| 7,451,996 B2 | 11/2008 | Miles et al. |
| 7,461,855 B2 | 12/2008 | Klar |
| 7,503,572 B2 | 3/2009 | Park et al. |
| 7,568,716 B2 | 8/2009 | Dietz |
| 7,571,922 B2 | 8/2009 | Pratchler |
| 7,584,983 B2 | 9/2009 | McKenney |
| 7,584,984 B1 * | 9/2009 | Williams, Jr. .............. 280/478.1 |

(56) References Cited

U.S. PATENT DOCUMENTS

| | | |
|---|---|---|
| 7,621,554 B1 | 11/2009 | Cremer |
| 7,669,876 B2 | 3/2010 | Kerpash, Sr. |
| 7,690,670 B1 | 4/2010 | Lincul |
| 7,690,671 B1 | 4/2010 | Jensen |
| 7,719,409 B1 | 5/2010 | Jones |
| 7,726,679 B2 | 6/2010 | Leuermann |
| 7,744,109 B2 | 6/2010 | Groh |
| 7,744,110 B1 | 6/2010 | Ramon |
| 7,753,393 B2 | 7/2010 | Young |
| 7,766,362 B1 | 8/2010 | Helton et al. |
| 7,770,870 B1 | 8/2010 | Fly |
| 7,780,323 B2 | 8/2010 | Nolle |
| 7,793,967 B2 * | 9/2010 | McConnell ............... 280/491.1 |
| 7,850,191 B1 | 12/2010 | Kaminski et al. |
| 7,850,192 B2 | 12/2010 | Ceccarelli et al. |
| 7,909,350 B1 * | 3/2011 | Landry ................... 280/479.2 |
| 8,047,559 B2 * | 11/2011 | Harlin ...................... 280/477 |
| 8,100,428 B2 * | 1/2012 | McConnell ............... 280/491.1 |
| 8,302,987 B2 * | 11/2012 | Williams et al. ......... 280/479.3 |
| 2001/0030409 A1 | 10/2001 | Williams |
| 2002/0003342 A1 | 1/2002 | Slatten |
| 2002/0005625 A1 | 1/2002 | Palmer |
| 2002/0008364 A1 | 1/2002 | Kahlstorf |
| 2002/0024195 A1 | 2/2002 | Heller |
| 2002/0056971 A1 | 5/2002 | Grasso et al. |
| 2002/0070529 A1 | 6/2002 | Dravecz |
| 2002/0089148 A1 | 7/2002 | Glass |
| 2002/0101055 A1 | 8/2002 | Warren |
| 2002/0105162 A1 | 8/2002 | Green |
| 2002/0117831 A1 | 8/2002 | Ahlquist et al. |
| 2002/0145268 A1 | 10/2002 | Zechbauer |
| 2002/0145269 A1 | 10/2002 | Carty |
| 2002/0189525 A1 | 12/2002 | Nathan |
| 2002/0195794 A1 | 12/2002 | Chumley |
| 2003/0011168 A1 | 1/2003 | Svensson |
| 2003/0030247 A1 | 2/2003 | Teague |
| 2003/0042707 A1 | 3/2003 | McCarty |
| 2003/0047909 A1 | 3/2003 | Alger |
| 2003/0051654 A1 | 3/2003 | Jarosek et al. |
| 2003/0075898 A1 | 4/2003 | Perkins |
| 2003/0080263 A1 | 5/2003 | McCoy |
| 2003/0094785 A1 | 5/2003 | Woods |
| 2003/0178809 A1 | 9/2003 | Anderson |
| 2003/0178810 A1 | 9/2003 | Reiter et al. |
| 2003/0209880 A1 | 11/2003 | Koestler |
| 2003/0218313 A1 | 11/2003 | Beaudoin |
| 2003/0222427 A1 * | 12/2003 | Wolters et al. ................. 280/495 |
| 2004/0017060 A1 | 1/2004 | Kinnard |
| 2004/0032112 A1 | 2/2004 | Reese et al. |
| 2004/0084876 A1 | 5/2004 | Losee |
| 2004/0094934 A1 | 5/2004 | Teague |
| 2004/0108685 A1 | 6/2004 | Pierce |
| 2004/0207176 A1 | 10/2004 | Webster et al. |
| 2004/0212175 A1 | 10/2004 | Jarosek |
| 2004/0217576 A1 | 11/2004 | Fox |
| 2004/0251659 A1 | 12/2004 | Amerson |
| 2005/0087955 A1 | 4/2005 | Kellogg |
| 2005/0121879 A1 | 6/2005 | Smith |
| 2005/0134020 A1 | 6/2005 | Wilks |
| 2005/0194761 A1 | 9/2005 | Givens |
| 2005/0218626 A1 | 10/2005 | Kwilinski |
| 2005/0230935 A1 | 10/2005 | Sauermann |
| 2006/0076755 A1 | 4/2006 | Bergeron |
| 2006/0097480 A1 | 5/2006 | Hegefeld |
| 2006/0097481 A1 | 5/2006 | Nicholas |
| 2006/0208455 A1 | 9/2006 | MacKarvich |
| 2006/0220345 A1 | 10/2006 | Schmidt |
| 2006/0255560 A1 | 11/2006 | Dietz |
| 2006/0273549 A1 | 12/2006 | Dietz |
| 2007/0007748 A1 | 1/2007 | Hancock |
| 2007/0029757 A1 | 2/2007 | Leuermann |
| 2007/0080516 A1 * | 4/2007 | Simmons .................. 280/491.3 |
| 2007/0108731 A1 | 5/2007 | McBroom |
| 2007/0114760 A1 | 5/2007 | Hegefeld |
| 2007/0205580 A1 | 9/2007 | Hamilton et al. |
| 2007/0205581 A1 | 9/2007 | Wilcox |
| 2007/0216135 A1 | 9/2007 | Rebick et al. |
| 2007/0216136 A1 | 9/2007 | Dietz |
| 2007/0241535 A1 | 10/2007 | Salyers |
| 2007/0252359 A1 | 11/2007 | Wishart et al. |
| 2008/0036177 A1 | 2/2008 | McKenney |
| 2008/0073872 A1 | 3/2008 | Scott |
| 2008/0179861 A1 | 7/2008 | Columbia |
| 2008/0197606 A1 | 8/2008 | Capuano |
| 2008/0217885 A1 | 9/2008 | Woolever et al. |
| 2008/0246254 A1 | 10/2008 | Tyerman |
| 2008/0277903 A1 | 11/2008 | Anderson et al. |
| 2009/0014982 A1 | 1/2009 | Wulff |
| 2009/0033061 A1 | 2/2009 | Hensley |
| 2009/0045604 A1 | 2/2009 | Bernart |
| 2009/0057633 A1 | 3/2009 | Beck et al. |
| 2009/0072516 A1 | 3/2009 | Kuenzel |
| 2009/0108563 A1 | 4/2009 | Groh |
| 2009/0127824 A1 | 5/2009 | Young |
| 2009/0127825 A1 | 5/2009 | Drake et al. |
| 2009/0146393 A1 | 6/2009 | Hawkins et al. |
| 2009/0189368 A1 | 7/2009 | Smith |
| 2009/0194969 A1 | 8/2009 | Bearey |
| 2009/0295123 A1 | 12/2009 | Good |
| 2010/0038882 A1 | 2/2010 | Chimento et al. |
| 2010/0109286 A1 | 5/2010 | Visser |
| 2010/0117332 A1 | 5/2010 | Harlin |
| 2010/0140900 A1 | 6/2010 | Zinn |
| 2010/0187489 A1 | 7/2010 | Hebert |
| 2010/0187793 A1 | 7/2010 | O'Quinn |
| 2010/0201100 A1 | 8/2010 | Hill |
| 2010/0264626 A1 | 10/2010 | Morehead |
| 2010/0289249 A1 | 11/2010 | McConnell |
| 2010/0314853 A1 | 12/2010 | Mallory |

OTHER PUBLICATIONS

International Preliminary Report on Patentability Corresponding to International Application No. PCT/US2010/057968; Date of Mailing: Sep. 20, 2012; 7 Pages.

* cited by examiner

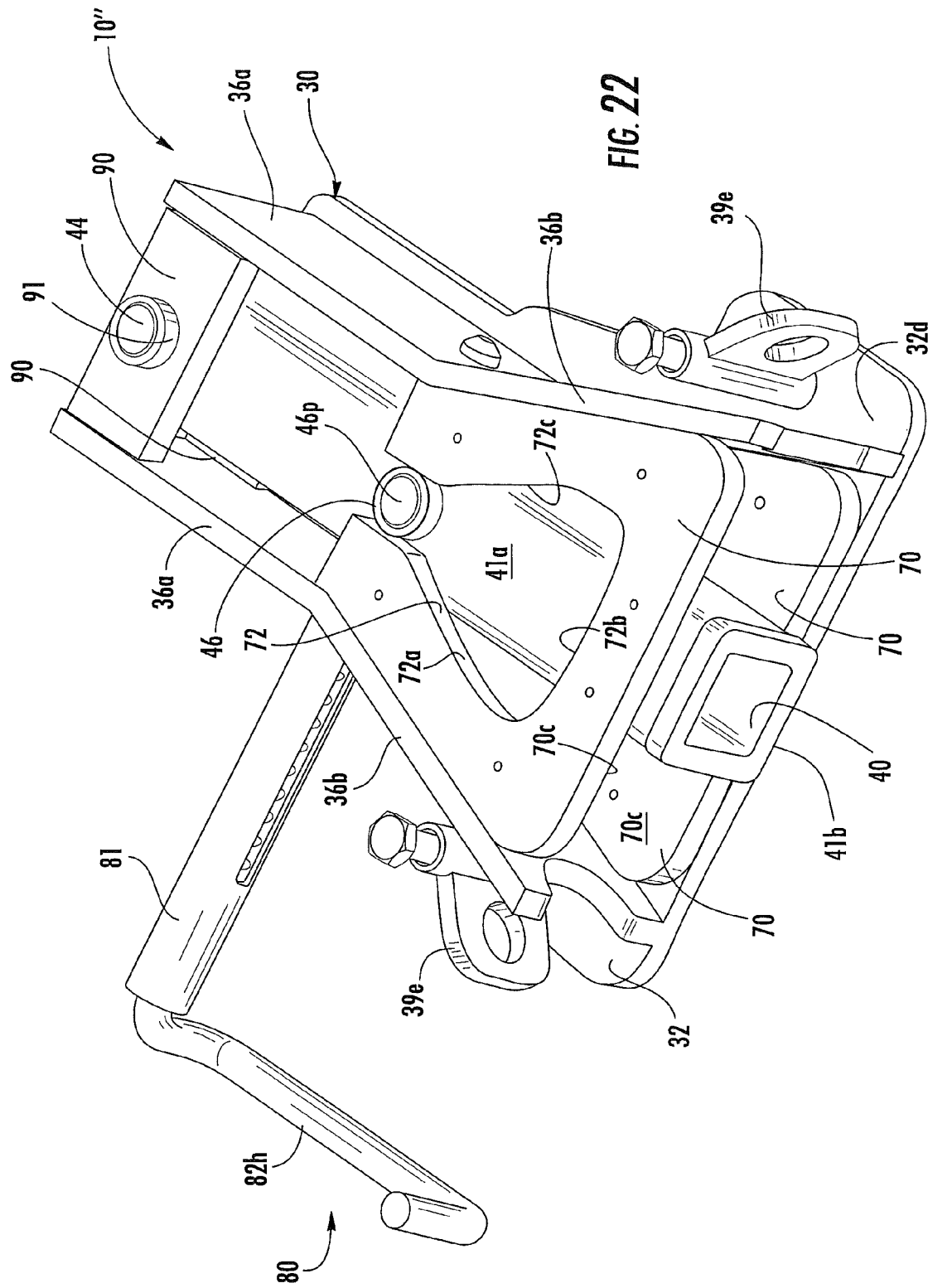

HITCH APPARATUS FOR VEHICLES

RELATED APPLICATION

This application claims the benefit of and priority to U.S. Provisional Patent Application No. 61/312,056 filed Mar. 9, 2010, the disclosure of which is incorporated herein by reference as if set forth in its entireties.

FIELD OF THE INVENTION

The present invention relates generally to vehicle towing and, more particularly, to towing apparatus.

BACKGROUND

Powered and trailed vehicles are conventionally interconnected for travel by coupling hitches involving fixed locations on the vehicles. Using ball and socket-type universal connections or pin-type connections, the required relative movement during travel is provided. The fixed locations, however, may be difficult to effect, particularly with large vehicles that prevent ready manual alignment for final coupling. When accurate alignment is not obtained, conventionally the towed vehicle is manually moved to proper position, which may require strength, dexterity and multiple personnel, often with an attendant risk of injury. As the tongue weight of a towed vehicle increases, the skill required and risk associated with coupling the towed vehicle to a towing vehicle may be substantially increased. The problem may be particularly troublesome for large steerable wheel trailers, such as those employed by the military.

Telescoping and pivoting hitches have been proposed to allow coupling between misaligned vehicles. Most are designed for lighter weight trailers and unsuited for heavy load applications. Others provide only a length-dependent articulation reducing the accommodated zone of vehicle misalignment.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, a hitch apparatus includes a housing configured to be attached to a vehicle and a tow bar movably disposed within the housing. The tow bar is movable relative to the housing between a fully retracted position and a plurality of extended positions. The tow bar is pivotable relative to the housing when in any of the extended positions. The housing includes spaced-apart first and second sections and a pair of spaced-apart side walls sandwiched between the first and second sections that define a cavity in which the tow bar is slidably disposed. The first section includes an elongated slot formed through a portion thereof.

A tow bar guide is attached to an interior side of the first section and includes an elongated opening formed therethrough with opposite first and second portions. The elongated opening first portion is an elongated slot with generally parallel sides. The elongated opening second portion has a generally triangular configuration with arcuate sides. The elongated opening first portion is aligned with the elongated slot in the housing first section. The configuration of the elongated opening second portion is designed to guide the tow bar as it is retracted into the housing. In addition, the configuration of the elongated opening second portion limits the extent to which the tow bar can pivot relative to the housing in the plurality of extended positions.

A first guide member extends outwardly from the tow bar at a proximal end of the tow bar, and a second guide member extends outwardly from a medial portion of the tow bar. The first guide member extends through the first portion of the elongated opening in the tow bar guide and is operably engaged with the slot in the first section. The second guide member is operably engaged with the second portion of the elongated opening in the tow bar guide. In some embodiments the first guide member is a wheel or roller that is configured to rotate within the first section slot as the tow bar is extended and retracted. In some embodiments, the second guide member comprises a wheel or roller that is also configured to rotate.

According to some embodiments of the present invention, the hitch apparatus includes a locking mechanism. The locking mechanism includes a locking member operably secured to the housing that is configured to releasably engage the tow bar (e.g., through an opening in the tow bar, etc.) to maintain the tow bar in a retracted position. A biasing member, such as a spring, is configured to compressively urge the locking member toward the tow bar. As such, the locking member engages a surface of the tow bar when the locking member is retracted from the opening and the tow bar is extended. In some embodiments, a biasing member is configured to slightly urge the tow bar outwardly from the housing when the locking member is disengaged from the tow bar to facilitate one-hand operation.

According to other embodiments of the present invention, a locking mechanism is operably secured to a rear portion of the housing and includes a latching member and a pawl member, each rotatably mounted to the housing. The latching member includes an elongated recess open to receive a rod secured to the tow bar adjacent the proximal end thereof. The latching member rotates between an open rod receiving position and a closed rod retaining position holding the tow bar in the retracted position. The pawl member includes a pawling surface that engages the latching member when the latching member rotates to the closed rod retaining position and holds the latching member in the closed rod retaining position. A handle is operably connected to the pawl member. In response to user activation of the handle, the pawl member rotates and disengages from the latching member so that the latching member can rotate and release the rod, thereby allowing the tow bar to be extended.

In some embodiments of the present invention, the latching member comprises a portion that engages the rod and urges the tow bar to an extended position when the latching member is rotated to the open rod receiving position. In other embodiments, a biasing member may be utilized to slightly urge the tow bar outwardly when the latching member is rotated to release the rod to facilitate one-hand operation.

According to other embodiments of the present invention, a hitch apparatus includes a housing configured to be attached to a vehicle and a tow bar movably disposed within the housing. The tow bar is movable relative to the housing between a fully retracted position and a plurality of extended positions. The tow bar is pivotable relative to the housing when in any of the extended positions. The housing includes spaced-apart first and second sections and a pair of spaced-apart side walls sandwiched between the first and second sections that define a cavity in which the tow bar is slidably disposed.

A first tow bar guide is attached to an interior side of the first section, and a second tow bar guide is attached to an interior side of the second section. Each tow bar guide has an elongated opening formed therethrough with opposite first and second portions. The elongated opening first portion of the first tow bar guide is aligned with an elongated slot in the first section, and the elongated opening first portion of the second tow bar guide is aligned with an elongated slot in the second section.

The tow bar includes a pair of first guide members that extend outwardly from respective opposite upper and lower sides of the tow bar at a proximal end of the tow bar. Each first guide member extends through the first portion of the elongated opening in a respective one of the first and second tow bar guides and is operably engaged with the slot in a respective one of the first and second sections. The tow bar also includes a pair of second guide members that extend outwardly from the respective upper and lower sides of the tow bar at a medial portion of the tow bar. Each second guide member is operably engaged with the elongated opening second portion of a respective one of the first and second tow bar guides.

A locking member is operably secured to the housing and is configured to releasably engage the tow bar (e.g., through an opening in the tow bar, etc.) to maintain the tow bar in a retracted position. In some embodiments the locking mechanism is configured to urge the tow bar to an extended position when the locking member is disengaged from the tow bar. A biasing member, such as a spring, is configured to compressively urge the locking member toward the tow bar. As such, the locking member engages a surface of the tow bar when the locking member is retracted from the opening and the tow bar is extended.

According to other embodiments of the present invention, a hitch apparatus includes a housing configured to be attached to a vehicle and a tow bar movably disposed within the housing. The tow bar is movable relative to the housing between a fully retracted position and a plurality of extended positions. The tow bar is pivotable relative to the housing when in any of the extended positions. The housing includes spaced-apart first and second sections that define a cavity in which the tow bar is slidably disposed. A tow bar guide is attached to an interior side of the first section, an includes an opening formed therethrough. The tow bar includes a guide member extending outwardly therefrom which is operably engaged with the tow bar guide opening. In some embodiments, the guide member is a wheel or roller that is configured to rotate. The tow bar guide opening has a configuration that limits an extent to which the tow bar can pivot relative to the housing. In addition, the configuration of the tow bar guide opening is such that an extent to which the tow bar can pivot relative to the housing progressively increases, as the tow bar is progressively extended. The hitch apparatus also includes a locking mechanism operably secured to the housing that releasably engages the tow bar to maintain the tow bar in a fully retracted position.

According to other embodiments of the present invention, a hitch apparatus includes a housing configured to be attached to a vehicle and a tow bar movably disposed within the housing. The tow bar is movable relative to the housing between a fully retracted position and a plurality of extended positions. The tow bar is pivotable relative to the housing when in any of the extended positions. The housing includes spaced-apart first and second sections that define a cavity in which the tow bar is slidably disposed. A first tow bar guide is attached to an interior side of the first section, and a second tow bar guide is attached to an interior side of the second section. Each tow bar guide has an opening formed therethrough. The tow bar includes a pair of guide members that extend outwardly from respective opposite upper and lower sides of the tow bar. Each guide member is operably engaged with the opening in a respective one of the first and second tow bar guides. The openings in the first and second tow bar guides limit an extent to which the tow bar can pivot relative to the housing. In addition, the configuration of each of the tow bar guide openings is such that an extent to which the tow bar can pivot relative to the housing progressively increases as the tow bar is progressively extended. The hitch apparatus also includes a locking mechanism operably secured to the housing that releasably engages the tow bar to maintain the tow bar in a fully retracted position.

According to other embodiments of the present invention, a hitch apparatus includes a housing configured to be attached to a vehicle and a tow bar movably disposed within the housing. The tow bar is movable relative to the housing between a fully retracted position and a plurality of extended positions. The tow bar is pivotable relative to the housing when in any of the extended positions. The housing includes spaced-apart first and second sections that define a cavity in which the tow bar is slidably disposed. A tow bar guide is attached to an interior side of the first section, and has a recess formed therein. A guide member extends outwardly from the tow bar and is operably engaged with the tow bar guide recess. The recess has a configuration that limits an extent to which the tow bar can pivot relative to the housing. Moreover, the recess has a configuration such that an extent to which the tow bar can pivot relative to the housing progressively increases as the tow bar is progressively extended. The hitch apparatus also includes a locking mechanism operably secured to the housing that releasably engages the tow bar to maintain the tow bar in a retracted position. In some embodiments, the locking mechanism is configured to urge the tow bar to an extended position when the locking member is disengaged from the tow bar.

According to other embodiments of the present invention, a hitch apparatus includes a housing configured to be attached to a vehicle and a tow bar movably disposed within the housing. The tow bar is movable relative to the housing between a fully retracted position and a plurality of extended positions. The tow bar is pivotable relative to the housing when in any of the extended positions. The housing includes spaced-apart first and second sections and a pair of spaced-apart side walls sandwiched between the first and second sections that define a cavity in which the tow bar is slidably disposed. The first section includes an elongated slot formed through a portion thereof. A tow bar guide is attached to an interior side of the first section and includes an opening formed therethrough. A first guide member extends outwardly from a proximal end of the tow bar and is operably engaged with the slot in the first section, and a second guide member extends outwardly from a medial portion of the tow bar and is operably engaged with the tow bar guide opening. The tow bar guide opening has a configuration that limits an extent to which the tow bar can pivot relative to the housing. Moreover, the tow bar guide opening has a configuration such that an extent to which the tow bar can pivot relative to the housing progressively increases as the tow bar is progressively extended. The hitch apparatus also includes a locking mechanism operably secured to the housing that releasably engages the tow bar to maintain the tow bar in a retracted position. In some embodiments, the locking mechanism is configured to urge the tow bar to an extended position when the locking member is disengaged from the tow bar.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

FIG. 22 is a top perspective of a hitch apparatus with the upper section removed and illustrating a tow bar guide, according to other embodiments of the present invention.

DETAILED DESCRIPTION

Figure 1:
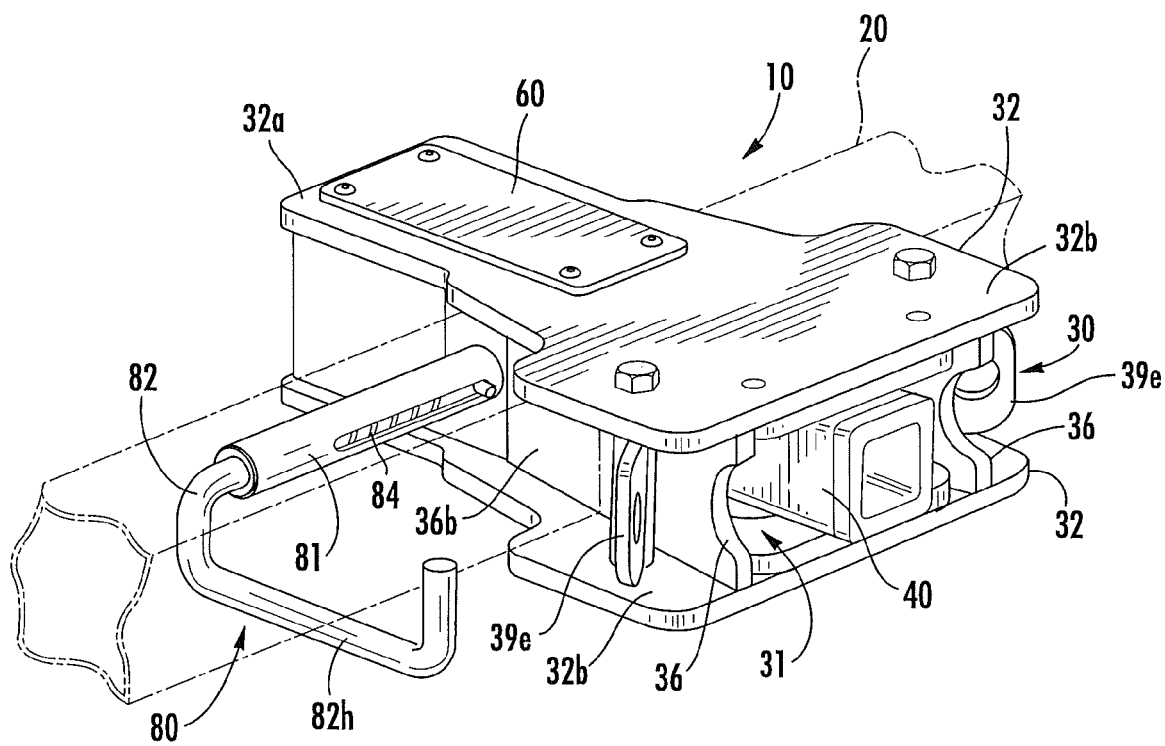
FIG. 1 is a top perspective view of a hitch apparatus, according to some embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines may illustrate optional features or elements unless specified otherwise. In addition, the sequence of operations (or steps) is not limited to the order presented in the figures and/or claims unless specifically indicated otherwise. Features described with respect to one figure or embodiment can be associated with another embodiment of figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in, the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "vehicle" includes all types of vehicles including, but not limited to, automobiles, trucks, military vehicles, airplanes, trains, etc., and also includes towed vehicles and towing vehicles.

Referring now to FIGS. 1-16, a hitch apparatus 10, according to some embodiments of the present invention, is illustrated. The hitch apparatus 10 is configured to be installed on a vehicle and, in some embodiments, is utilized with a frame 20 that is mounted to a chassis/frame and/or underside of a vehicle. In the illustrated embodiment, the frame 20 is only partially shown in dotted-line format for clarity. Embodiments of the present invention are not limited to being attached to any particular type or shape of frame. A frame, if utilized with the hitch apparatus 10, can have various configurations and shapes to facilitate mounting of the hitch apparatus 10 to the underside or other portion of a particular vehicle. The hitch apparatus 10 can be mounted to a vehicle in some embodiments without the use of a frame.

Figure 4:
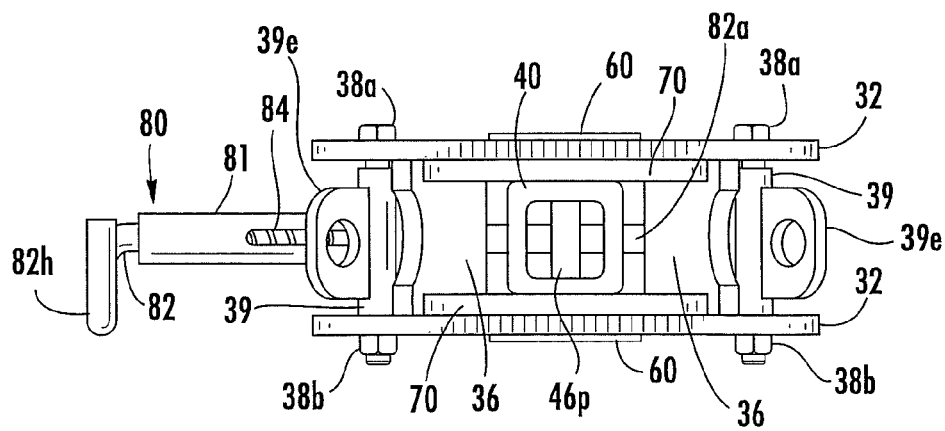
FIG. 4 is a front elevation view of the hitch apparatus of FIG. 3 taken along lines 4-4.
Figure 5:
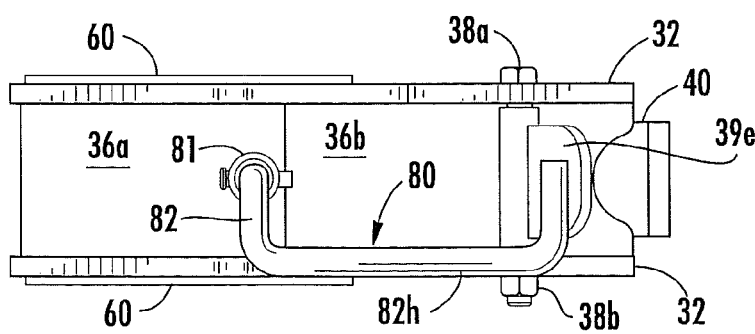
FIG. 5 is a side elevation view of the hitch apparatus of FIG. 3 taken along lines 5-5.

The hitch apparatus 10 includes a housing 30 and a tow bar 40 movably disposed within the housing 30. The illustrated housing 30 includes spaced-apart first and second sections 32 that define a longitudinally extending forwardly opening cavity 31 within which the tow bar 40 is movably disposed. The illustrated housing 30 also includes a pair of side walls 36 sandwiched between the first and second sections 32 in spaced-apart relationship. The first and second sections are secured together in spaced-apart relationship via a pair of fasteners 38 and spacer tubes 39. Each illustrated fastener 38 includes a threaded bolt 38a and a correspondingly threaded nut 38b configured to threadingly engage the bolt 38a (FIG. 4). However, various types of fasteners may be utilized in accordance with embodiments of the present invention including, but not limited to, threaded rods, rivets, etc. In addition, one or more portions of the first and second sections 32 and side walls 36 may be welded together. In some embodiments, various combinations of fasteners and welding may be utilized, as would be understood by those skilled in the art. In some embodiments, fasteners 38 may be eliminated and the first and second sections are attached to the side walls 36 only via welding.

In the illustrated embodiment, a safety chain receiving member 39e extends outwardly from each spacer tube 39. Each safety chain receiving member 39e is a generally flat plate member with an aperture formed therethrough that is configured to receive a hook of a safety chain attached to a trailer or other towed vehicle, as would be understood by those skilled in the art. Each safety chain receiving member 39e may be integrally formed with a respective spacer tube 39 or may be otherwise attached to the spacer tube 39, for example, via welding and/or fasteners.

Figure 12:
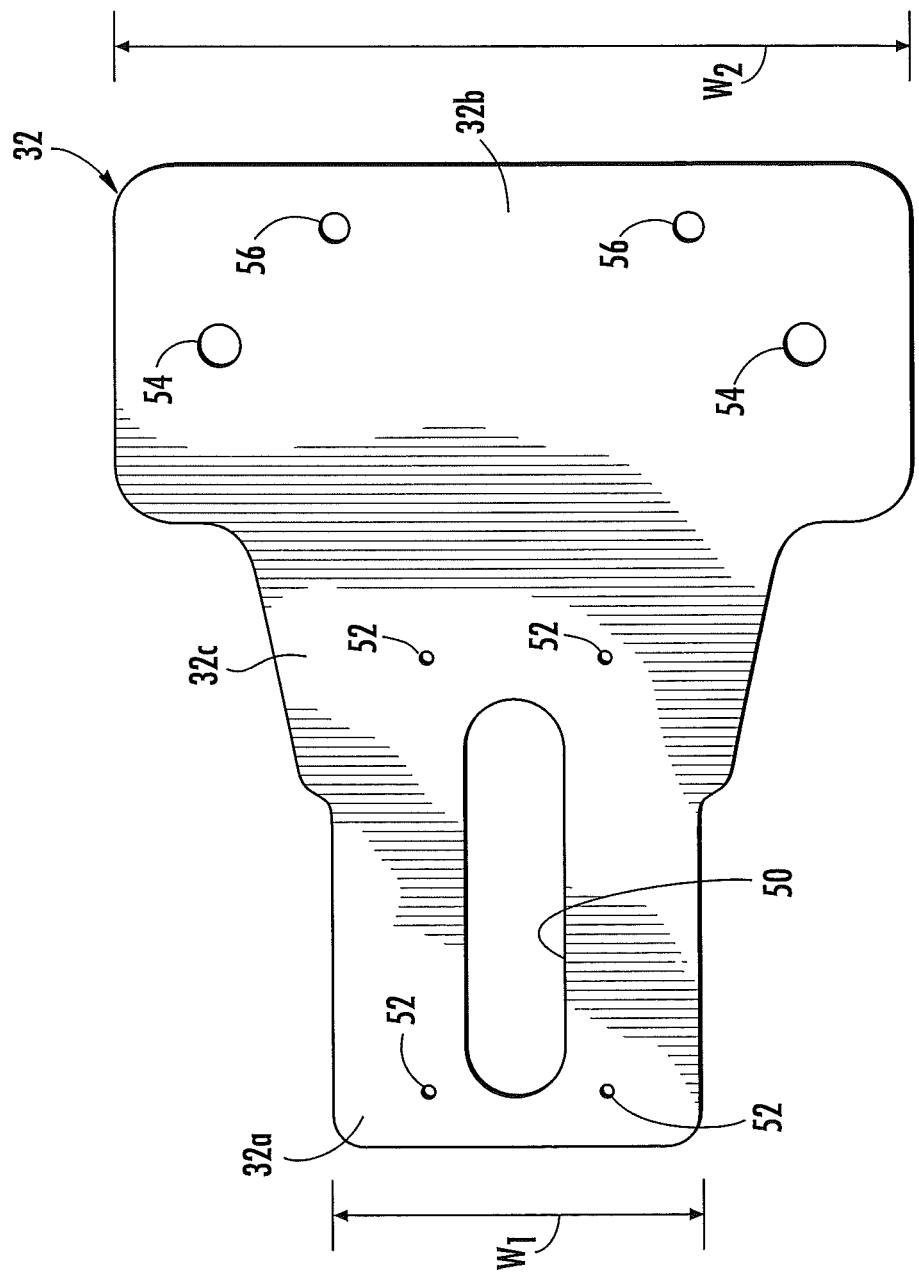
FIG. 12 is a top plan view of one of the housing first and second sections in the hitch apparatus of FIG. 1.

In the illustrated embodiment, the housing first and second sections 32 are plate members, each having respective opposite proximal and distal end portions 32a, 32b joined by a diverging medial portion 32c. FIG. 12 is a plan view of one of the first and second sections 32 that shows the configuration of the illustrated embodiment. Each of the first and second sections 32 has a proximal end portion 32a with a width $W_1$ that is less than a width $W_2$ of the distal end portion 32b. Each of the first and second sections 32 also includes an elongated slot 50 adjacent the proximal end portion 32a. Threaded openings 52 surround the elongated slot 50 and are utilized to secure, via fasteners 61 (e.g., bolts, screws, etc), a cover plate 60 to the first and second sections 32 so as to overlie the elongated slot 50 (FIGS. 1-5).

Each one of the first and second sections 32 also includes a pair of apertures 54 formed therethrough for receiving fasteners 38. Each one of the first and second sections 32 also includes a pair of apertures 56 formed therethrough for receiving alignment pins 71 (FIG. 6) extending from a respective tow bar guide 70 (described below) to facilitate proper alignment of the tow bar guide 70 in the housing 30.

Embodiments of the present invention are not limited to the illustrated shape and configuration of the first and sections 32. Various shapes and configurations may be utilized. Furthermore, although illustrated as plate members with generally planar configurations, one or both of the first and second sections 32 may have one or more portions with a non-planar configuration.

Figure 10:
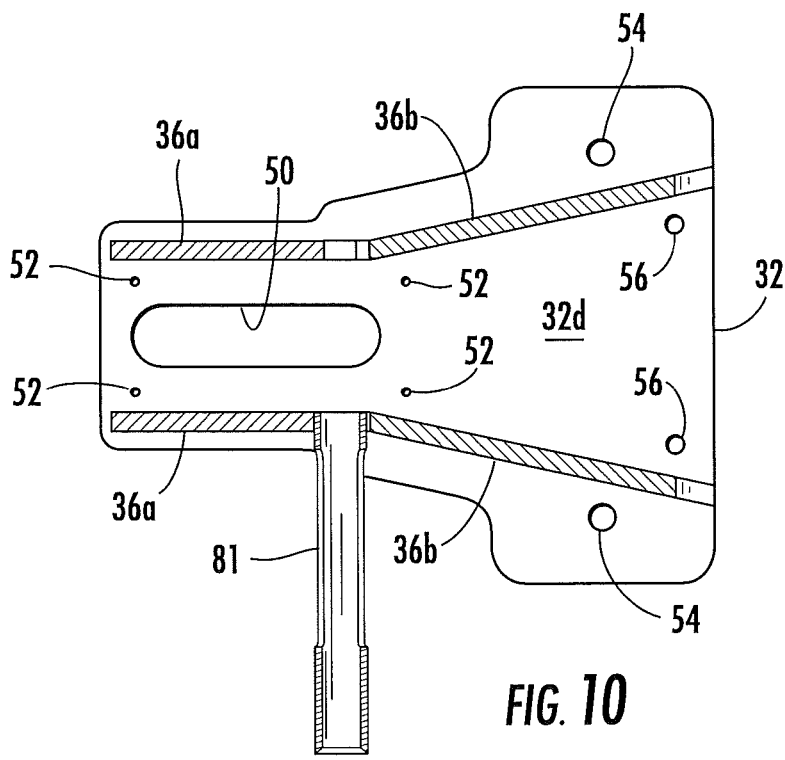
FIG. 10 is a cross-sectional view of the hitch apparatus of FIG. 9 taken along lines 10-10.
Figure 11:
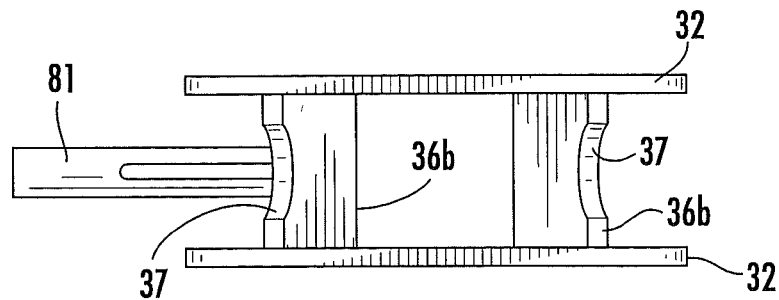
FIG. 11 is a front elevation view of the hitch apparatus of FIG. 9 taken along lines 11-11.

The illustrated side walls 36 include proximal and distal sections 36a, 36b (FIGS. 2 and 9-11). The proximal sections 36a of the side walls 36 are generally parallel and the distal sections 36b of the side walls 36 diverge, as illustrated in FIGS. 10 and 11. The diverging configuration of distal sections 36b provides clearance for the tow bar 40 to pivot relative to the housing 30 as the tow bar 40 is extended. In the illustrated embodiment, the end portion 37 of each of the side wall distal sections 36b has a concave configuration. This concave configuration provides clearance for and/or access to a coupling apparatus attached to the tow bar 40.

Referring back to FIG. 2, the illustrated tow bar 40 is a tubular member having a proximal end portion 40a and a distal end portion 40b connected by a center or medial portion 40c. The tow bar distal end portion 40b includes an opening 42 that is configured to receive a coupling apparatus, such as a tow ball, pintle clip, lunette ring, etc. In some embodiments, the tow bar distal end portion 40b may include a coupling apparatus integrally formed therewith.

Embodiments of the present invention are not limited to the illustrated tubular configuration of the tow bar 40. Other configurations may be utilized. For example, in some embodiments, the tow bar 40 may have other tubular cross-sectional shapes. In other embodiments, the tow bar 40 may be a solid member or plate.

The tow bar 40 and various components of the housing 30 can be formed from various materials known to those skilled in the art. An exemplary material for one or more of the components includes, but is not limited to, case-hardened steel.

A pair of first guide members 44 extend outwardly from respective opposite upper and lower sides 41a, 41b of the tow bar 40 at the proximal end thereof, and a pair of second guide members 46 extend outwardly from the respective upper and lower sides 41a, 41b of the tow bar 40 at a medial portion 40c thereof, as illustrated. The pair of first guide members 44 are connected via a rod or other type of rigid connection member 44p (FIG. 16) that extends through and is secured to the tow bar 40. The pair of second guide members 46 are connected via a rod or other type of rigid connection member 46p (FIG. 16) that extends through and is secured to the tow bar 40. In some embodiments, one or both of the first guide members 44 are rollers, such as steel rollers, and are rotatably secured to respective ends of the rigid connection member 44p. Similarly, in some embodiments, one or both of the second guide members 46 are rollers, such as steel rollers, and are rotatably secured to respective ends of the rigid connection member 46p. Rotation of the first guide members 44 within the respective openings 50 in the upper and lower sections 32, and/or rotation of the second guide members 46 within the respective elongated opening second portion 74, as will be described below, can facilitate smooth operation of the tow bar 40 as it is extended and retracted relative to the housing 30.

However, in other embodiments, one or more of the guide members 44, 46 are non-rotatable. In some embodiments, one or more of the guide members 44, 46 may comprise a bearing material or other low friction material that facilitates movement of the guide members 44, 46 within the elongated opening 72 of a respective tow bar guide 70.

As will be described below, the first guide members 44 are operably engaged with elongated slots 50 in the upper and lower sections 32. The second guide members 46 are operably engaged with a second portion 74 of an elongated opening 72 in tow bar guides 70 to control the extent to which the tow bar 40 can be extended and pivoted, relative to the housing 30.

Figure 2:
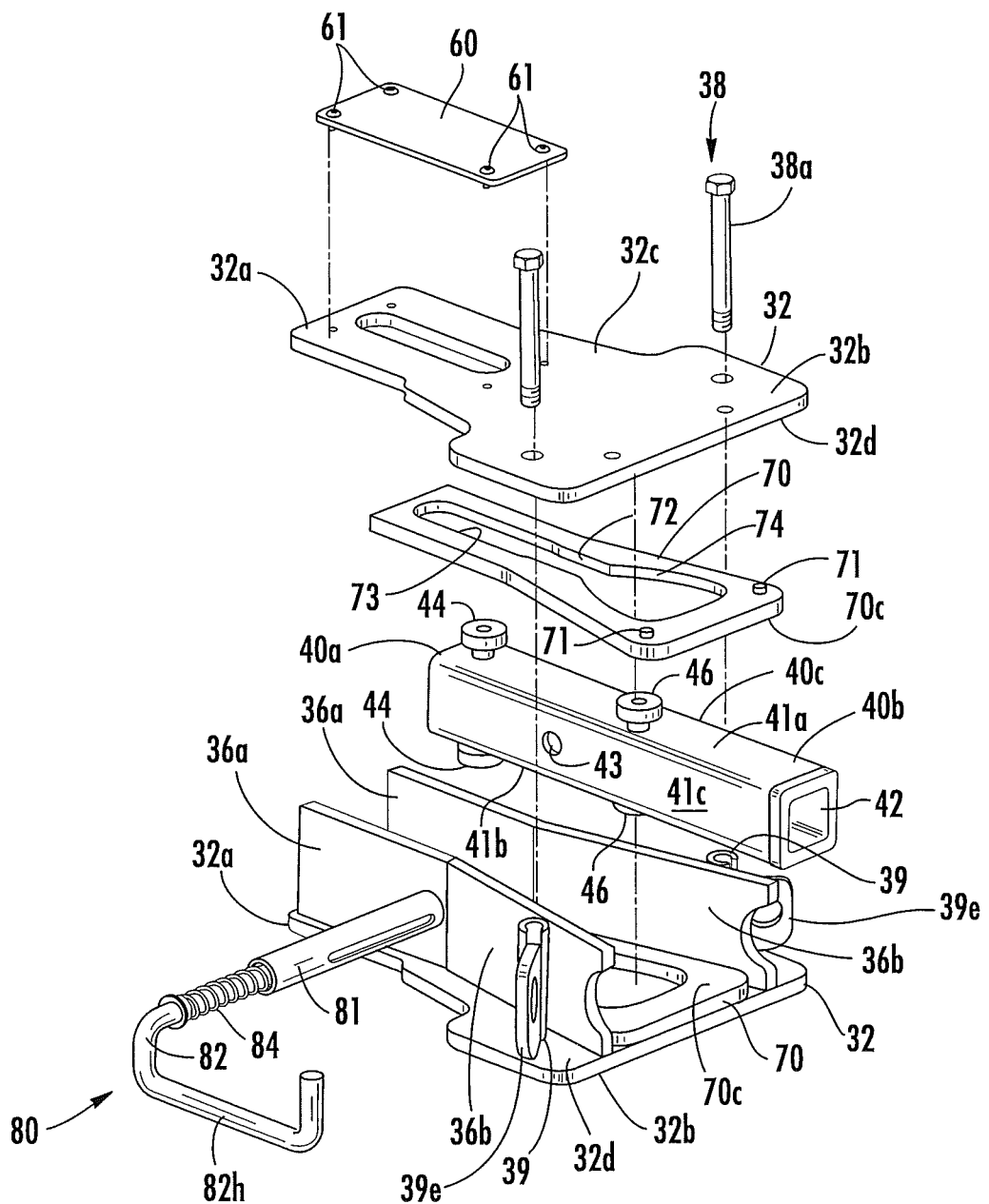
FIG. 2 is an exploded perspective view of the hitch apparatus of FIG. 1 with the vehicle attachment frame removed for clarity.
Figure 3:
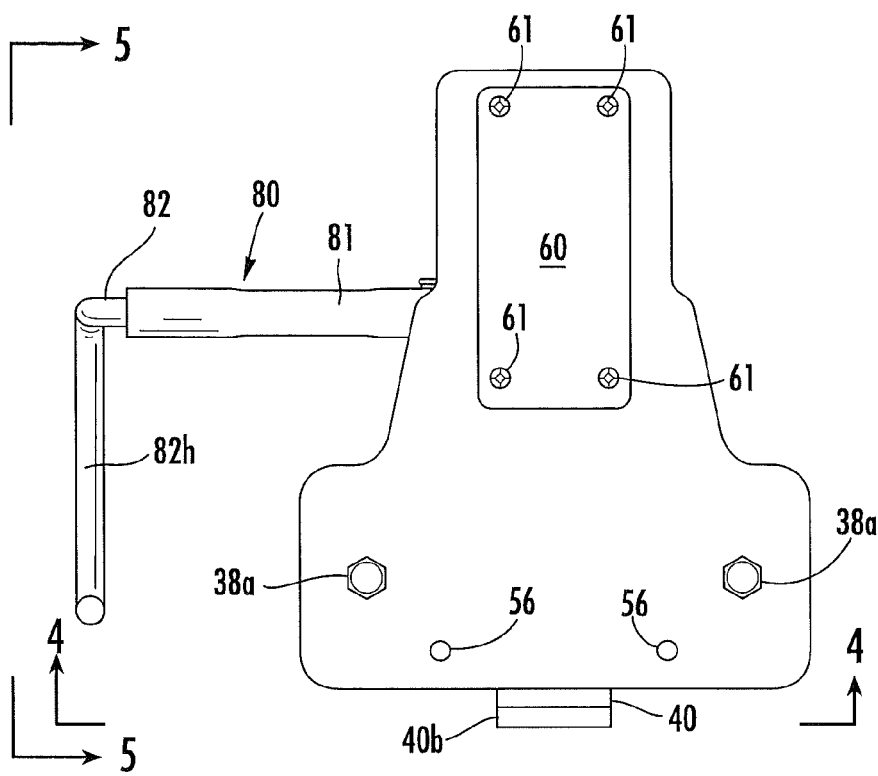
FIG. 3 is a top plan view of the hitch apparatus of FIG. 1 with the vehicle attachment frame removed for clarity.
Figure 6:
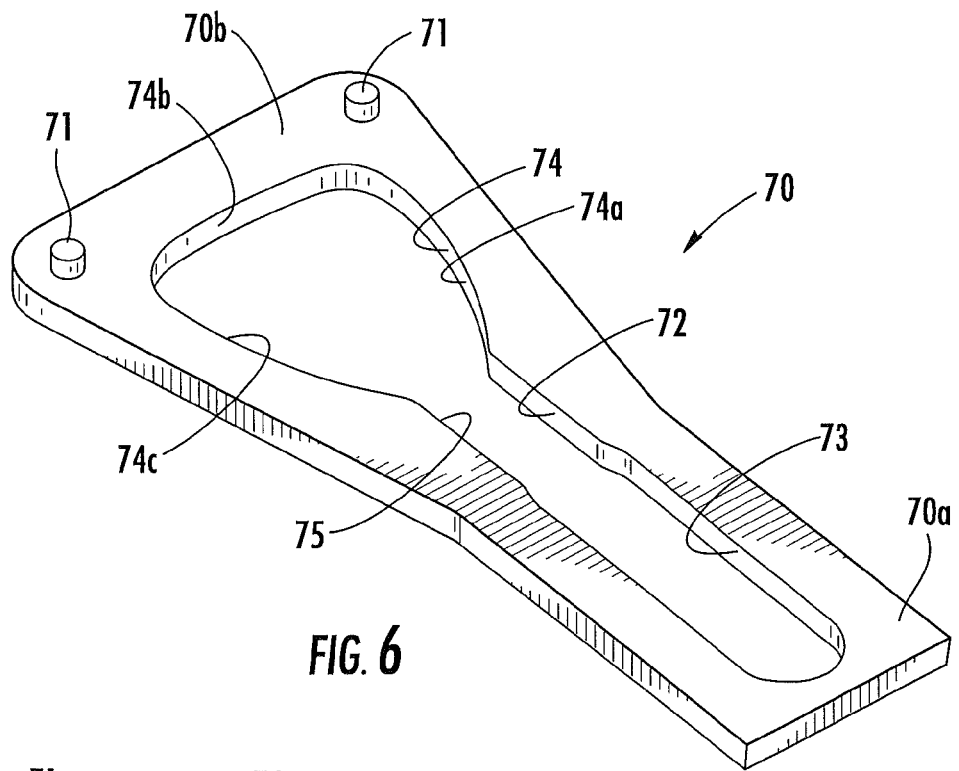
FIG. 6 is a perspective view of one of the tow bar guide members in the hitch apparatus of FIG. 1.

Referring to FIGS. 1, 2 and 4, the illustrated hitch apparatus 10 includes first and second tow bar guides 70 that are configured to cooperate with guide members 44, 46. A first tow bar guide 70 is attached to an interior side 32d of the first section 36, and a second tow bar guide 70 is attached to an interior side 32d of the second section 32. The first and second to bar guides 70 each include a pair of alignment pins 71 extending outwardly therefrom, as illustrated in FIG. 6. The alignment pins 71 of each tow bar guide 70 are configured to be inserted in apertures 56 (FIG. 12) in a respective first and second section 32 to facilitate proper alignment of the tow bar guides 70 within the housing 30 and such that each tow bar guide 70 is in face-to-face contacting relationship with a respective section 32.

In some embodiments of the present invention, each tow bar guide 70 is sandwiched between the tow bar 40 and a respective one of the first and second sections 32 during assembly and maintained in place without the use of fasteners and/or welding. In some embodiments of the present invention, the assembly of the tow bar 40, components of the housing 30, and tow bar guides 70 are maintained in the assembled configuration via fasteners 38. In other embodiments, each tow bar guide 70 is attached to a respective section 32 via welding and/or fasteners. In some embodiments, each tow bar guide may be adhesively attached to a respective section 32. Also, various combinations of adhesives, welding and/or fasteners may be utilized.

Figure 7:
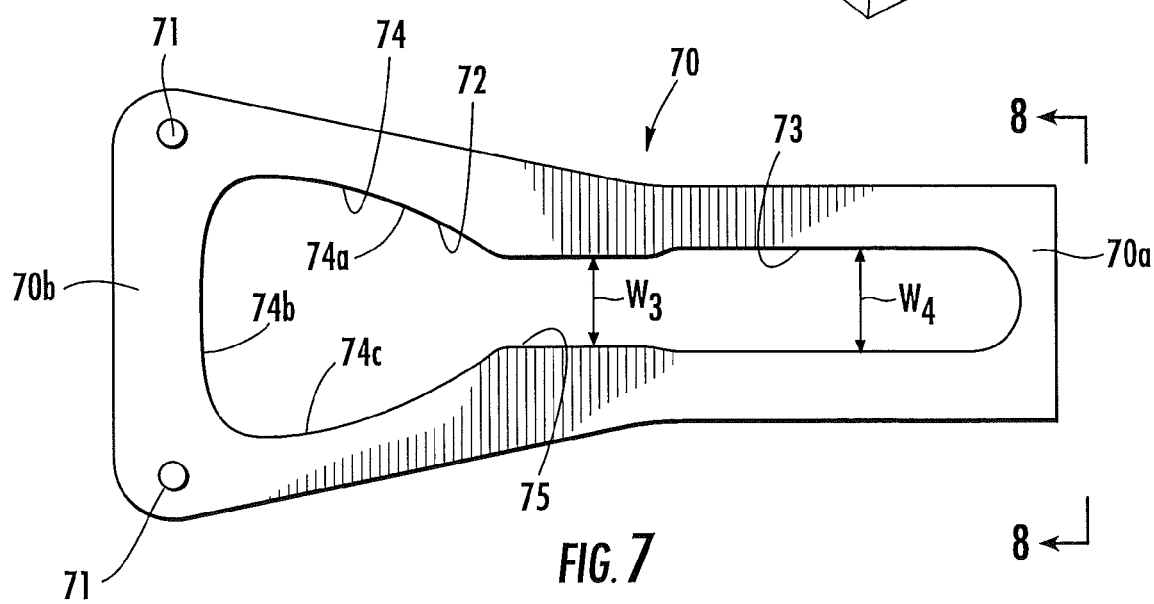
FIG. 7 is a top plan view of the tow bar guide of FIG. 6.
Figure 8:
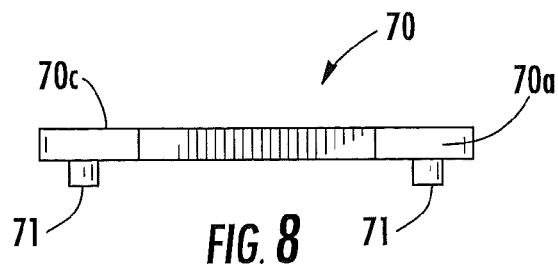
FIG. 8 is an end view of the tow bar guide of FIG. 7 taken along lines 8-8.
Figure 9:
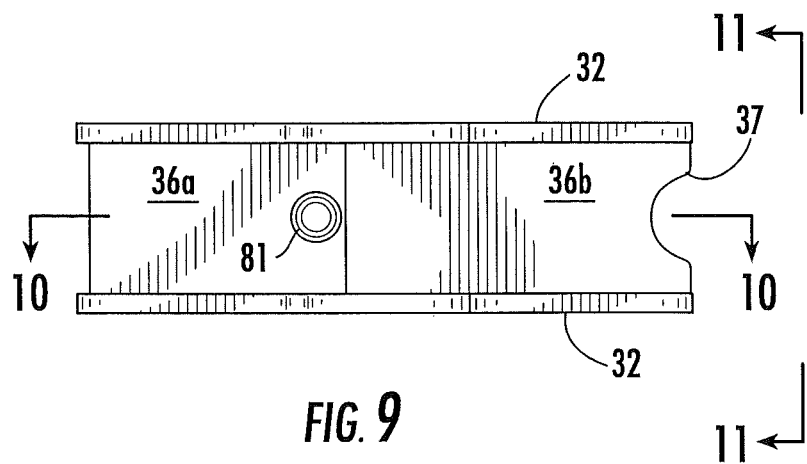
FIG. 9 is a side elevation view of the hitch apparatus of FIG. 1 with the frame, tow bar, tow bar guide plates, and tow bar locking device removed for clarity.

FIGS. 6-8 illustrate one of the tow bar guides 70. Each tow bar guide 70 has an elongated, planar configuration with opposite proximal and distal end portions 70a, 70b. Embodiments of the present invention are not limited to the illustrated shape of the tow bar guides 70. Tow bar guides 70 may have various shapes and configurations.

Figure 13:
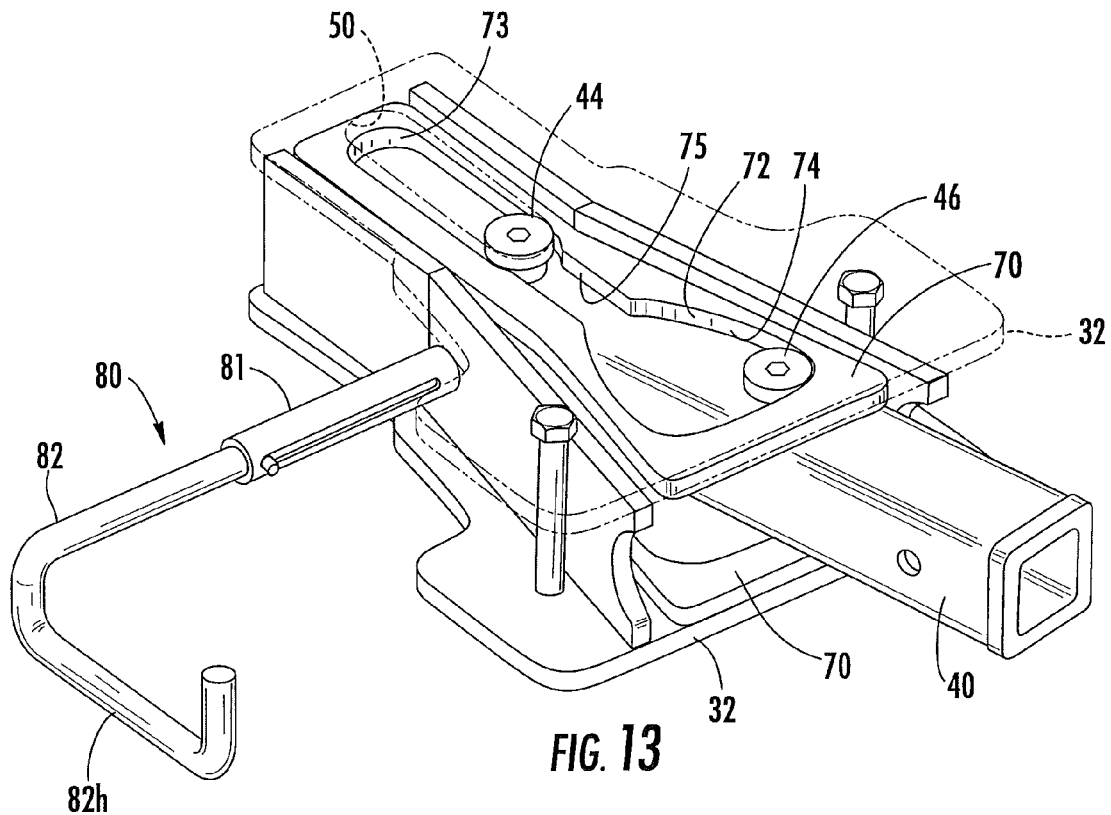
FIGS. 13-15 are partial cut-away perspective views of the towing apparatus of FIG. 1 illustrating movement of the tow bar relative to the hitch apparatus housing, according to some embodiments of the present invention.
Figure 14:
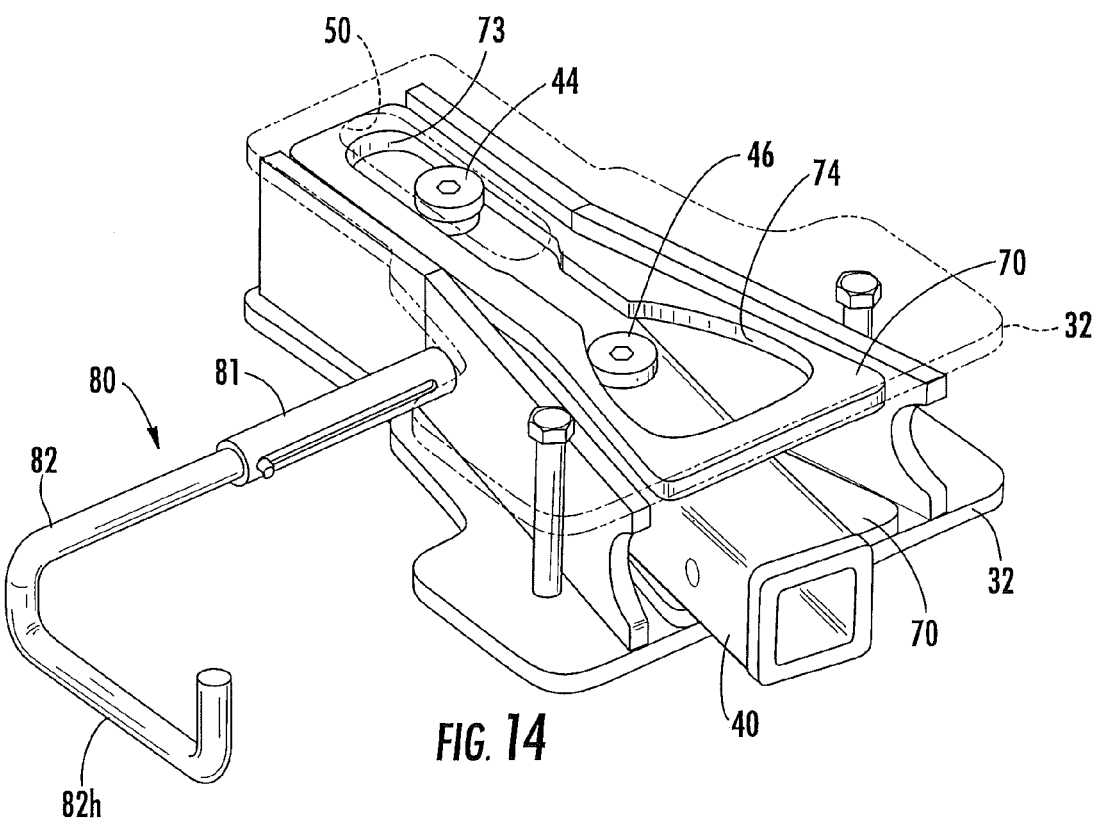
Figure 15:
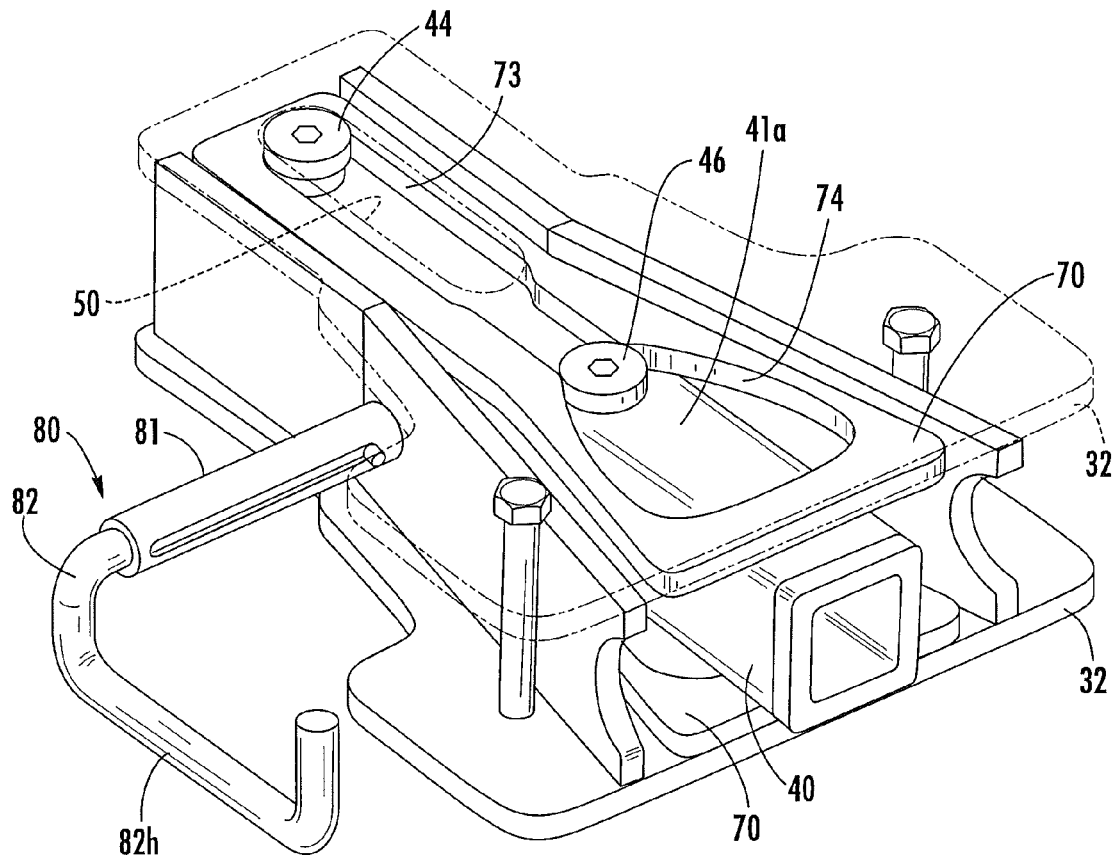
Figure 16:
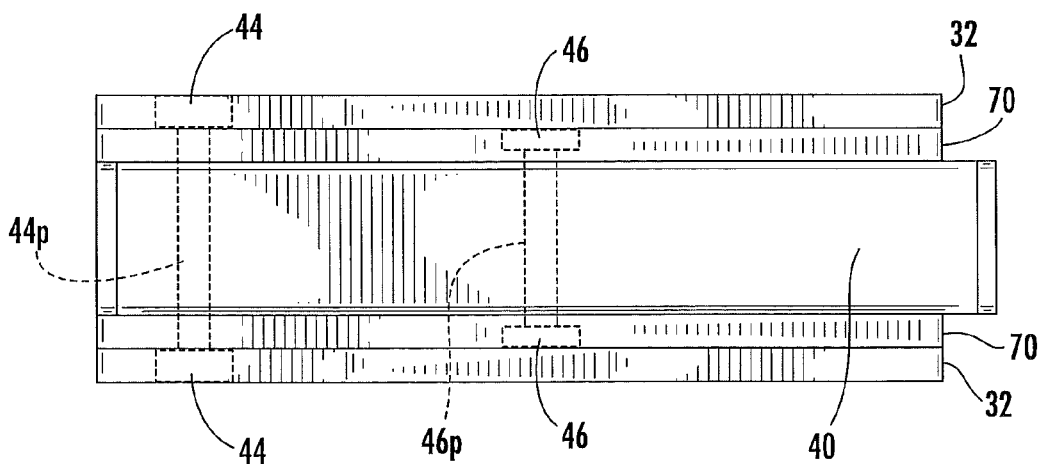
FIG. 16 is a side, cross-sectional view of the hitch apparatus of FIG. 1 with the side wall removed for clarity and illustrating the configuration and engagement of the tow bar first and second guide members.
Figure 17:
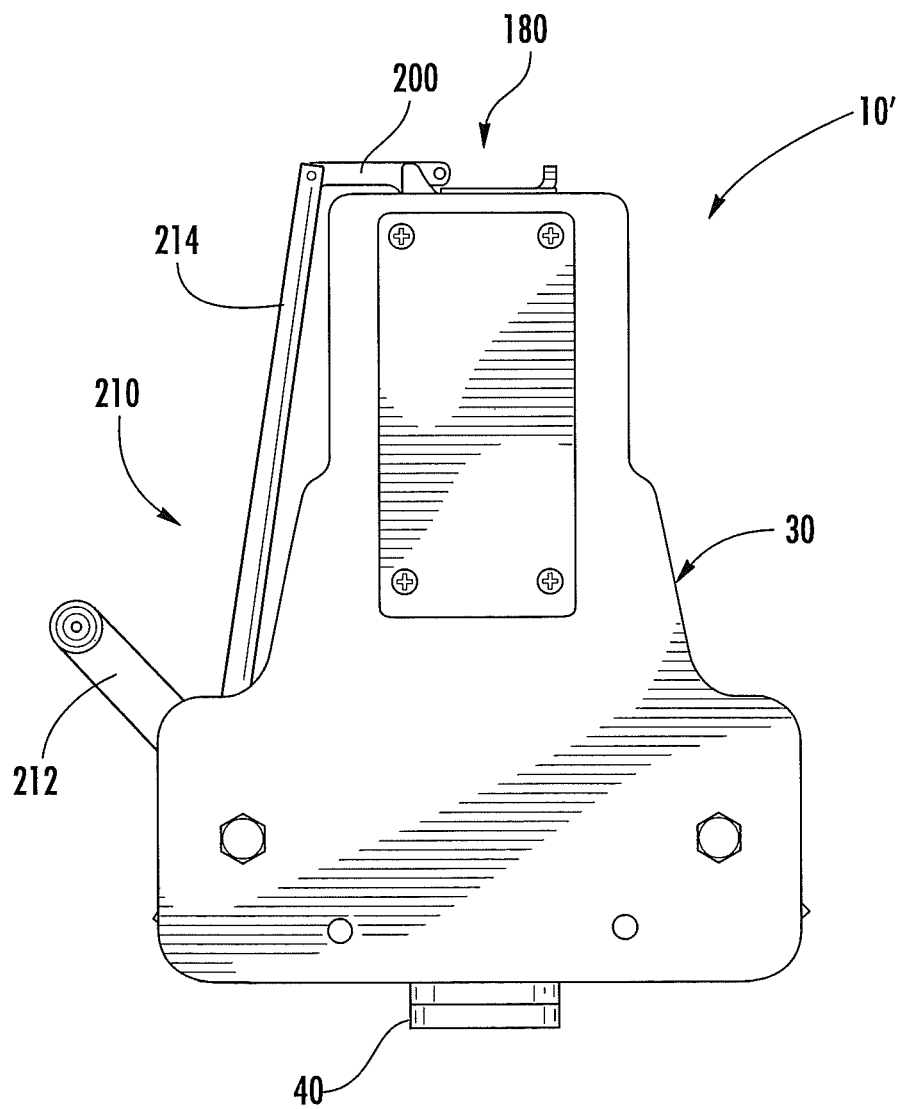
FIG. 17 is a top plan view of a hitch apparatus, according to some embodiments of the present invention.

Each illustrated tow bar guide 70 has an elongated opening 72 formed therethrough with opposite first and second portions 73, 74. The first and second portions 73, 74 of the elongated opening 72 are separated by a medial portion 75, as illustrated. The medial portion 75 of the opening 72 has a width $W_3$ that is less than the width $W_4$ of the first portion 73, as illustrated. The width $W_4$ of the elongated opening first portion 73 of each tow bar guide 70 is large enough to allow a tow bar first guide member 44 to be extended therethrough so as to operably engage the elongated slot 50 in a respective section 32 (FIGS. 13-15). The width $W_3$ of the elongated opening medial portion 75 of each tow bar guide 70 is such that the tow bar first and second guide members 44, 46 cannot pass therethrough. As such, the elongated opening medial portion 75 of each tow bar guide 70 serves as a stop for the tow bar first and second guide members 44, 46, and thus limits the distance the tow bar 40 can be extended from the housing 30.

In some embodiments of the present invention, the elongated opening 72 illustrated in FIGS. 6-8 may be replaced with two separate openings. For example, a tow bar guide 70 may include a first opening that is the equivalent of the opening first portion 73 of FIGS. 6-8, and a separate, second opening that is the equivalent of the second portion 74 of FIGS. 6-8. As such, the medial portion 75 of the opening illustrated in FIGS. 6-8 can be eliminated. In some embodiments, a recess in the shape of the elongated opening 72 may be formed in one or both tow bar guides 70 in lieu of elongated opening 72. Embodiments of the present invention are not limited to elongated openings 72 formed through each tow bar guide 70.

The first portion 73 of the illustrated tow bar guide elongated opening 72 is aligned with the elongated slot in a respective one of the first and second sections 32 when the tow bar guide 70 is attached to the section 32. Thus, in the illustrated embodiment of FIG. 1, the first portion 73 of the elongated opening 72 for the bottom tow bar guide 70 is aligned with the elongated slot in the bottom section 32, and the first portion 73 of the elongated opening 72 for the top tow bar guide 70 is aligned with the elongated slot 50 in the top section 32 (FIG. 13-16).

The second portion 74 of the illustrated tow bar guide elongated opening 72 has a generally triangular configuration with generally arcuate sides 74a, 74b, 74c. As illustrated in FIG. 7, the width of the triangular shaped second portion 74 decreases in the direction toward the elongated opening first portion 73. The second portion 74 of the tow bar guide elongated opening 72 is configured to receive a respective one of the tow bar second guide members 46 operably engaged with a respective elongated opening second portion 74 (FIGS. 13-16). The cooperation of the upper and lower second guide members 46 and respective elongated opening second portions 74 allows the tow bar 40 to swivel relative to the housing 30 as the tow bar 40 is extended from the housing 30. The cooperation of the upper and lower second guide members 46 and respective elongated opening second portions 74 also serves the function of properly guiding the tow bar 40 back into the housing 30 as the tow bar is moved from an extended position to a fully retracted position. In the illustrated embodiment, the configuration of the elongated opening second portion 74 is such that an extent to which the tow bar 40 can pivot relative to the housing 30 progressively increases as the tow bar 40 is progressively extended.

In the illustrated embodiment of the present invention, the upper and lower sides 41a, 41b of the tow bar 40 are in contacting relationship respectively with a respective tow bar guide surface 70c. Each tow bar guide surface 70c serves as a bearing that facilitates sliding of the tow bar 40 as it is being extended and retracted. An exemplary bearing material is NYLATRON® brand bearing material. NYLATRON® brand bearing material has numerous properties that are particularly suitable for the hitch apparatus 10. For example, NYLATRON® brand bearing material has high mechanical strength, stiffness, hardness, and toughness. In addition, NYLATRON® brand bearing material exhibits good fatigue resistance, high mechanical damping ability, good sliding properties, and good wear resistance.

However, various other types of bearing materials may be utilized, without limitation. In some embodiments, the entire tow bar guide 70 may be formed from a bearing material. In other embodiments, the tow bar guide surface 70 may be a coating or layer of bearing material. In some embodiments of the present invention, the bearing material may have a coefficient of friction of about 0.5 or less.

In the illustrated embodiment, a locking mechanism 80 is operably secured to the housing 30 and is configured to releasably engage the tow bar 40 to maintain the tow bar 40 in a fully retracted position. The locking mechanism 80 includes a housing 81 that is in communication with the hitch apparatus housing cavity 31 (FIG. 10). The illustrated housing 81 has a round, tubular configuration. However, other configurations may be utilized. Embodiments of the present invention are not limited to the configuration of the illustrated locking mechanism housing 81.

A locking member 82 is movably secured within the housing 81 and is movable between a position wherein a free end 82a (FIG. 4) of the locking member 82 is inserted through an opening 43 in the tow bar 40 (FIG. 2) to maintain the tow bar 40 in a fully retracted position (FIGS. 1, 3-5 and 15), and a position wherein the locking member free end 82a is disengaged from the tow bar opening 43 (FIGS. 13 and 14). The illustrated locking member 82 includes a handle 82h to facilitate disengaging the locking member 82 from the tow bar 40 by a user.

A biasing member 84 (FIGS. 1, 2 and 4), such as a spring, is operably associated with the locking member 82 within the housing 81 and compressively biases the locking member 82 toward the tow bar 40, as would be understood by those skilled in the art of the present invention. The biasing member 84 is configured to help retain the locking member 82 within the tow bar opening 43 when the tow bar 40 is fully retracted (FIGS. 1, 3-5 and 15). In addition, when the locking member 82 is disengaged from tow bar opening 43 and the tow bar 40 is in any extended position, the biasing member 84 urges the locking member free end 82a into contact with the side surface 41c (FIG. 2) of the tow bar 40. When the tow bar 40 is moved back to the fully retracted position, the biasing member 84 urges the locking member 82 into the tow bar opening 43 to secure the tow bar 40 in the fully retracted position and prevent movement thereof.

FIGS. 13-16 illustrate movement of the tow bar 40 relative to the hitch apparatus housing 30 and operation of the respective first and second guide members 44, 46. First guide members 44 are operably engaged within the elongated slot 50 in respective upper and lower sections 32, as illustrated, and limit the extent to which the tow bar 40 can be extended. Second guide members 46 are operably engaged within the second portion 74 of the elongated opening 72 in respective upper and lower tow bar guides 70.

In FIG. 13, the locking member 82 is disengaged from the tow bar opening 43 and the tow bar 40 is fully extended. First guide members 44 have reached the medial portion 75 of the elongated opening 72 in each tow bar guide 70 and the tow bar 40 cannot be extended further. As the tow bar 40 is retracted within the housing 30 (FIG. 14), the engagement of second guide members 46 and elongated opening second portion 74 guide the tow bar 40 back into the housing 30 to the fully retracted position (FIG. 15).

Although not illustrated, a biasing member, such as a spring, may be utilized to urge the tow bar 40 outwardly slightly from the housing when the locking member 82 is disengaged from the tow bar opening 43. This movement prevents the locking member 82 from re-engaging the tow bar opening 43. As such, a user only needs one hand to unlock and extend the tow bar 40. The biasing member can have any of various shapes and configurations including, but not limited to a coil spring, a leaf spring, etc. Moreover, the biasing member can be mounted internally or externally to the housing 30 at virtually any location.

Figure 18:
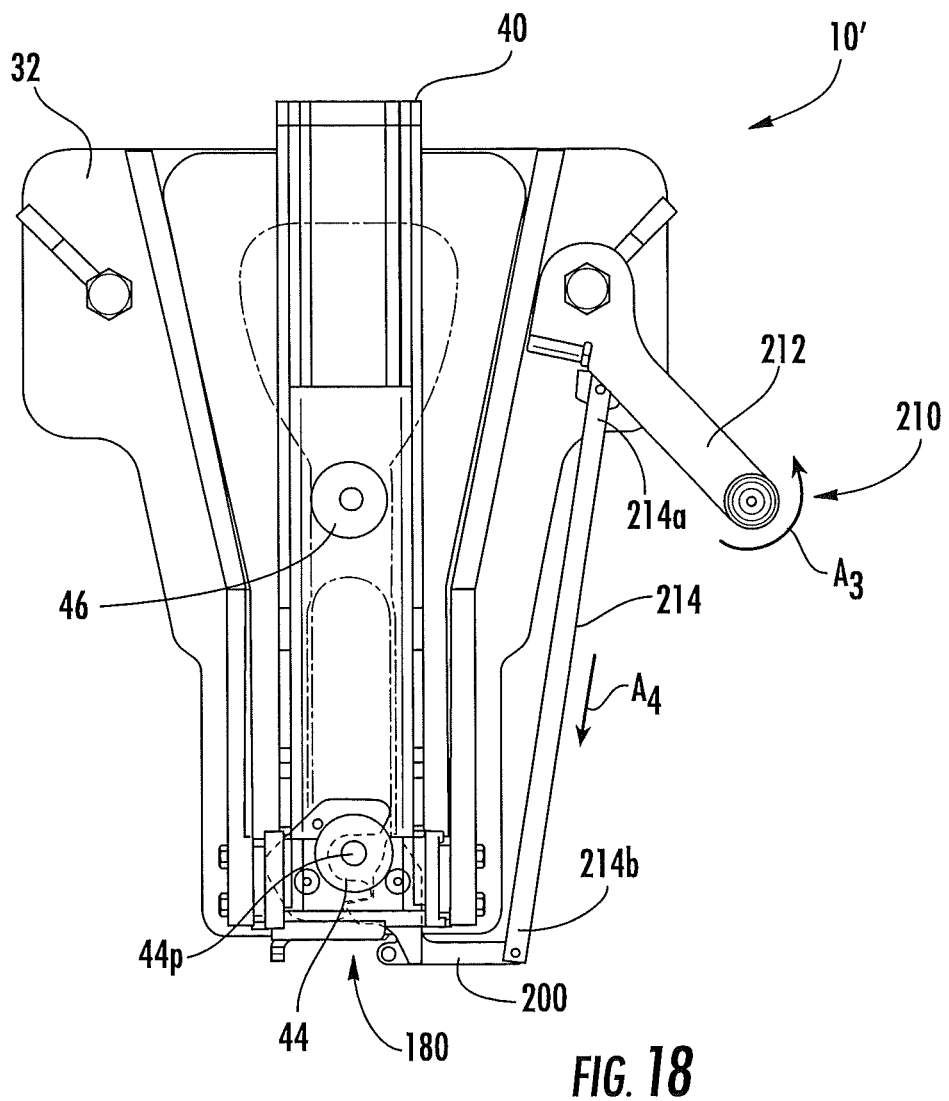
FIG. 18 illustrates the hitch apparatus of FIG. 17 with the upper section and upper tow bar guide removed for clarity.
Figure 19:
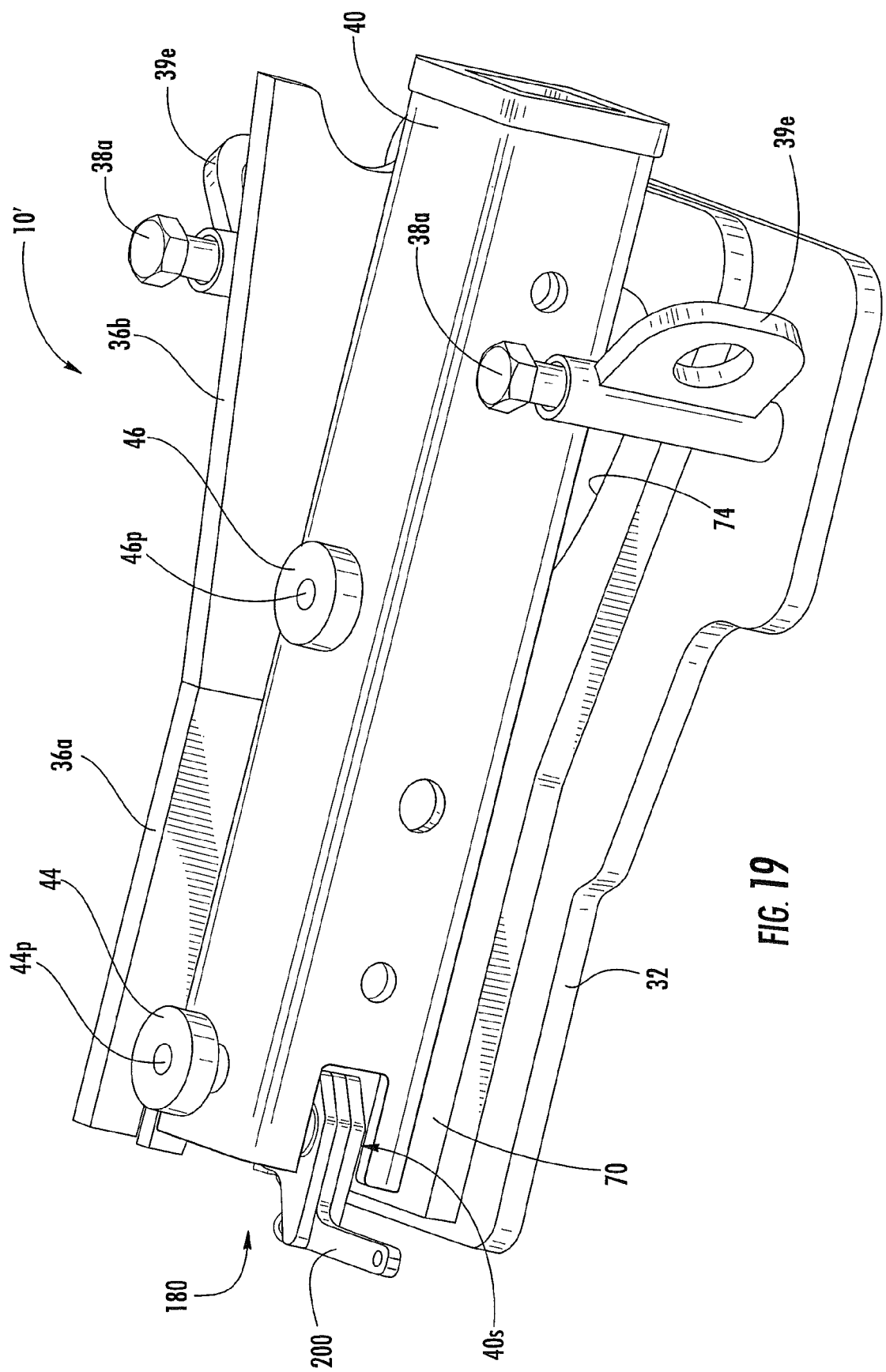
FIG. 19 is a top perspective view of the hitch apparatus of FIG. 18 with the locking member linkage and a side wall removed for clarity.
Figure 20:
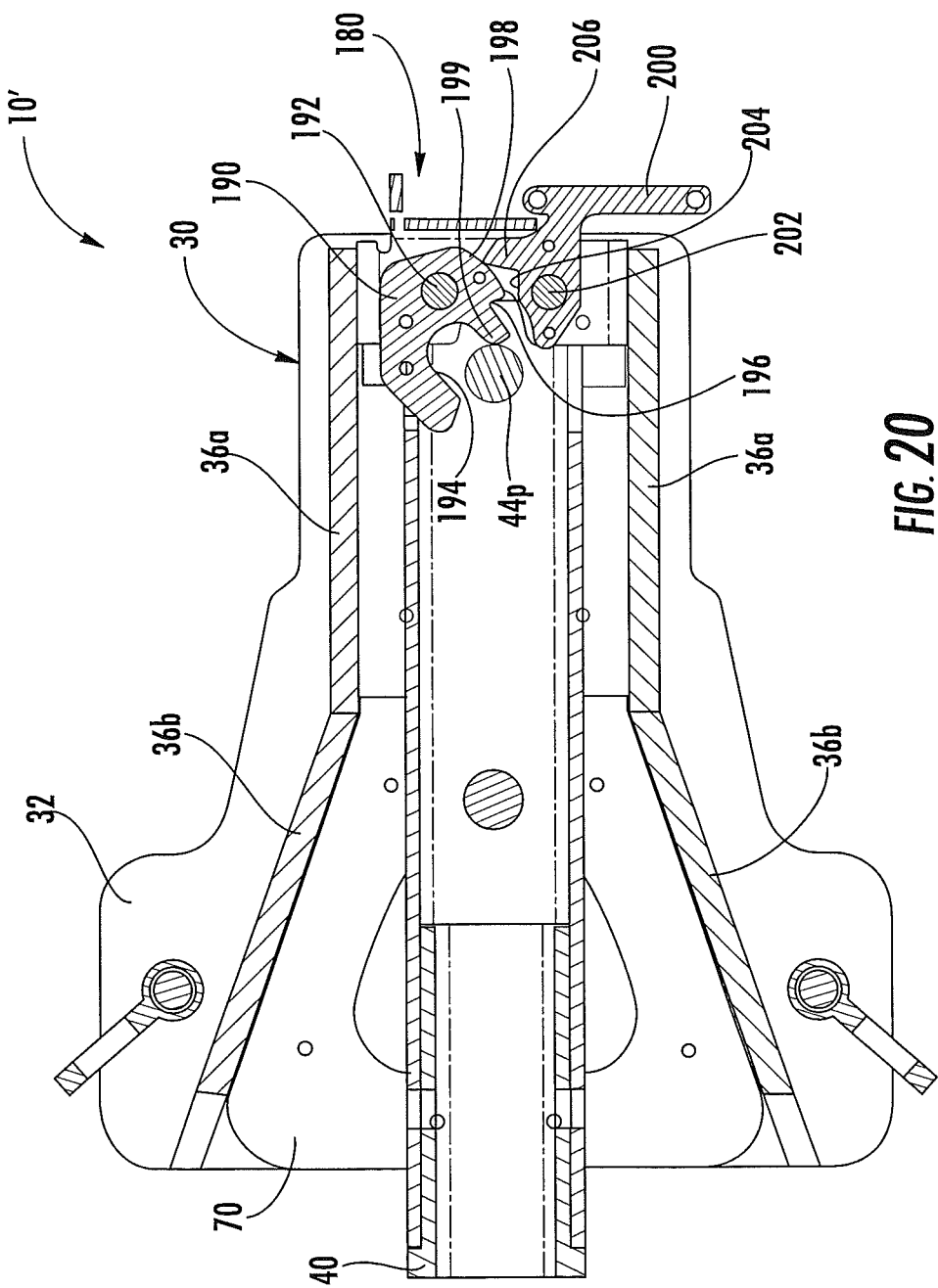
FIG. 20 illustrates the locking mechanism of the hitch apparatus of FIG. 17 in an unlocked configuration, according to some embodiments of the present invention.
Figure 21:
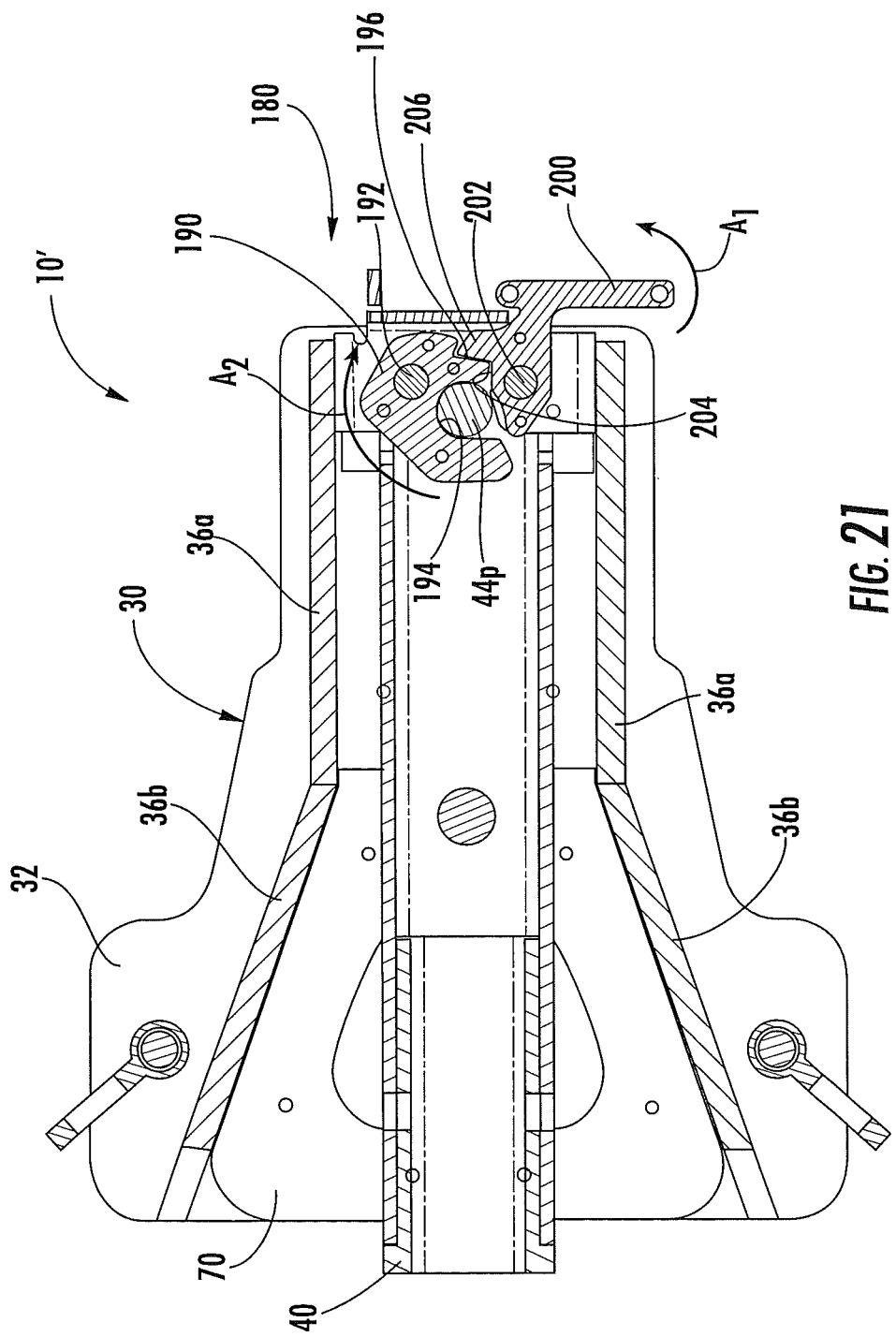
FIG. 21 illustrates the locking mechanism of the hitch apparatus of FIG. 17 in a locked configuration, according to some embodiments of the present invention.

Referring to FIGS. 17-21, a hitch apparatus 10', according to other embodiments of the present invention, is illustrated. The hitch apparatus 10' is similar to the hitch apparatus 10 of FIGS. 1-16 with the exception of the location and configuration of locking mechanism 180. The illustrated locking mechanism 180 is positioned at the rear or proximal end portion of the housing 30 and includes a latching member 190, a pawl member 200, and a handle assembly 210. The latching member 190 is rotatably mounted to the housing 30 via a shaft 192 (FIG. 20). The latching member 190 includes an elongated recess 194 (FIG. 20) that is open to receive the first guide member support rod 44p. In operation, the latching member 190 rotates between a rod receiving position (FIG. 20) and a closed rod retaining position (FIG. 21). When the support rod 44p is secured within the latching member elongated recess 194 as illustrated in FIG. 21, the tow bar 40 is locked in the fully retracted position. The latching member 190 also includes a locking recess 196 formed in an edge portion 198 thereof.

The pawl member 200 is rotatably mounted to the housing 30 via a shaft 202 and includes a pawling surface or edge portion 204 that engages the latching member 190 when the latching member 190 rotates to the closed rod retaining position (FIG. 21). The pawling surface 204 includes a locking tooth 206 that is configured to engage the locking recess 196, as illustrated in FIG. 21, and hold the latching member 190 in the closed rod retaining position. Rotational movement of the pawl member 200 (indicated by arrow $A_1$, FIG. 21) causes the locking tooth 206 to rotate the latching member 190 (indicated by arrow $A_2$, FIG. 21) from the closed rod retaining position (FIG. 21) to the open rod receiving position (FIG. 20). This rotational movement of the latching member 190 causes finger member 199 to impart a camming action against the first guide member support rod 44p and urge the tow bar 40 slightly outward from the housing 30. This movement prevents the guide member support rod 44p from re-engaging with the latching member 190. As such, a user only needs one hand to both unlock and extend the tow bar 40.

A user utilizes the handle assembly 210 (FIG. 18) to rotate the pawl member 200 so as to allow the tow bar 40 to be extended. The illustrated handle assembly 210 includes a handle 212 and an elongated arm 214. The arm is operably connected to the handle 212 at one end 214a and to the pawl member 200 at the opposite end 214b, as illustrated in FIG. 18. The handle 212 is rotatably secured to the housing 30. Rotation of the handle 212 by a user (indicated by arrow $A_3$) causes the arm 214 to move in the direction indicated by arrow $A_4$ (FIG. 18) which rotates the pawl member 200 so as to rotate the latching member 190 from the closed rod retaining position (FIG. 21) to the open rod receiving position (FIG. 20).

In the illustrated embodiment, the tow bar 40 has two slots 40s at the proximal end thereof (FIG. 19). Slots 40s provide clearance for the locking mechanism 180 so that it can access the support rod 44p.

Although not illustrated, a biasing member, such as a spring, may be utilized in other embodiments of the present invention to slightly urge the tow bar 40 outwardly from the housing when the latching member 190 is moved from the closed rod retaining position (FIG. 21) to the open rod receiving position (FIG. 20), according to other embodiments of the present invention. This movement prevents the guide member support rod 44p from re-engaging with the latching member 190. As such, a user only needs one hand to unlock and extend the tow bar 40. The biasing member can have any of various shapes and configurations including, but not limited to a coil spring, a leaf spring, etc. Moreover, the biasing member can be mounted internally or externally to the housing 30 at virtually any location.

Referring to FIG. 22, a hitch apparatus 10", according to other embodiments of the present invention, is illustrated. The hitch apparatus 10" is similar to the hitch apparatus 10 of FIGS. 1-16 with the exception of the configuration of the tow bar guides 70. The tow bar guides 70 in the illustrated hitch apparatus 10" are shorter than the tow bar guides 70 utilized in the hitch apparatus 10 of FIGS. 1-16. Similar to the hitch apparatus 10 of FIGS. 1-16, a first tow bar guide 70 is attached to an interior side of the first section (not shown for clarity), and a second tow bar guide 70 is attached to an interior side 32d of the second section 32. Each tow bar guide 70 has an elongated, planar configuration with a single opening 72 formed therethrough.

The opening 72 in each tow bar guide has a generally triangular configuration with generally arcuate sides 72a, 72b, 72c. The width of the triangular shaped opening 72 decreases in the direction toward the rear of the housing 30, as illustrated. The opening 72 of each tow bar guide 70 is configured to receive a respective one of the tow bar guide members 46, as described above. The pair of guide members 46 are connected via a rod or other type of rigid connection member 46p that extends through and is secured to the tow bar 40, as described above. In some embodiments, one or both of the guide members 44 are rollers, such as steel rollers, and are rotatably secured to respective ends of the rigid connection member 44p.

In some embodiments, a recess may be formed in one or both tow bar guides 70 that cooperates with a respective guide member 46 in lieu of opening 72. Embodiments of the present invention are not limited to openings 72 formed through each tow bar guide 70.

The cooperation of the upper and lower guide members 46 and respective openings 72 allows the tow bar 40 to swivel relative to the housing 30 as the tow bar 40 is extended from the housing 30. The cooperation of the upper and lower guide members 46 and respective openings 72 also serves the function of properly guiding the tow bar 40 back into the housing 30 as the tow bar 40 is moved from an extended position to a fully retracted position. In the illustrated embodiment, the configuration of each opening 72 is such that an extent to which the tow bar 40 can pivot relative to the housing 30 progressively increases as the tow bar 40 is progressively extended.

In the illustrated embodiment, the upper and lower sides 41a, 41b of the tow bar 40 are in contacting relationship respectively with a respective tow bar guide surface 70c. Each tow bar guide surface 70c serves as a bearing that facilitates sliding of the tow bar 40 as it is being extended and retracted. An exemplary bearing material is NYLATRON® brand bearing material, as described above. However, various other types of bearing materials may be utilized, without limitation. In some embodiments, the entire tow bar guide 70 may be formed from a bearing material. In other embodiments, the tow bar guide surface 70c may be a coating or layer of bearing material. In some embodiments of the present invention, the bearing material may have a coefficient of friction of about 0.5 or less.

In the illustrated embodiment of FIG. 22, a pair of plate members 90 are secured to respective opposite upper and lower sides 41a, 41b of the tow bar 40 at the proximal end of the tow bar 40. Each plate 90 may be formed from steel or other rigid material. In some embodiments, each plate may be formed from a bearing material, such as NYLATRON® brand bearing material. In some embodiments, a surface of each plate that is in face-to-face relationship with a respective housing section surface 32d may be a bearing material, such as NYLATRON® brand bearing material.

A pair of guide members 44 extend outwardly from respective opposite upper and lower sides 41a, 41b of the tow bar 40. As described above, the pair of guide members 44 are connected via a rod or other type of rigid connection member (e.g., 44p, FIG. 16) that extends through and is secured to the tow bar 40. Each plate member 90 includes an aperture (not shown) formed through a medial portion thereof. A cylindrical boss 91 extends outwardly from each plate member 90 and is in communication with each respective aperture. Each guide member 44 is secured within a respective boss 91.

Although illustrated as having a generally rectangular configuration, plate members 90 may have various non-rectangular shapes and configurations, as well. For example, in some embodiments of the present invention, each plate member 90 may have a generally oval shape with opposite ends of the oval positioned adjacent respective housing side walls 36a.

In some embodiments, plate members 90 are not utilized, and the guide members 44 are operably engaged within respective elongated slots 50 (FIG. 12) in the upper and lower housing sections 32.

In the illustrated embodiment, a locking mechanism 80 is operably secured to the housing 30 and is configured to releasably engage the tow bar 40 to maintain the tow bar 40 in a fully retracted position, as described above.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A hitch apparatus, comprising:
   a housing configured to be attached to a vehicle, wherein the housing comprises spaced-apart first and second sections that define a cavity, wherein the first section has an elongated slot formed therethrough;
   a tow bar guide attached to an interior side of the first section, wherein the tow bar guide has an elongated opening formed therethrough, and wherein a first portion of the elongated opening is aligned with the first section elongated slot; and
   a tow bar movably disposed within the housing cavity, wherein the tow bar is movable relative to the housing between retracted and extended positions, and is pivotable relative to the housing when in the extended position, wherein a guide member extends outwardly from a proximal end of the tow bar and through the first portion of the elongated opening and is operably engaged with the elongated slot in the first section.

2. The hitch apparatus of claim 1, wherein the guide member comprises a roller configured to rotate within the first section elongated slot as the tow bar is extended and retracted.

3. The hitch apparatus of claim 1, wherein the elongated opening in the tow bar guide has a second portion adjacent the first portion, wherein a second guide member extends outwardly from a medial portion of the tow bar and is operably engaged with the elongated opening second portion, wherein the elongated opening second portion has a configuration that limits an extent to which the tow bar can pivot relative to the housing.

4. The hitch apparatus of claim 3, wherein the second guide member comprises a roller configured to rotate.

5. The hitch apparatus of claim 3, wherein the elongated opening second portion has a configuration such that the extent to which the tow bat can pivot relative to the housing progressively increases as the tow bar is progressively extended.

6. The hitch apparatus of claim 1, wherein the first and second sections are plate members.

7. The hitch apparatus of claim 6, wherein the tow bar guide is a generally planar member that is attached to the interior side of the first section in face-to-face contacting relationship.

8. The hitch apparatus of claim 1, wherein the tow bar is in contacting relationship with the tow bar guide as the tow bar is moved between the retracted and extended positions.

9. The hitch apparatus of claim 8, wherein the tow bar guide comprises material having a coefficient of friction less than about 0.5.

10. The hitch apparatus of claim 1, wherein a distal end of the tow bar is configured to removably receive a coupling apparatus.

11. The hitch apparatus of claim 1, further comprising a locking mechanism operably secured to the housing that releasably engages the tow bar to maintain the tow bar in the retracted position.

12. The hitch apparatus of claim 11, wherein the tow bar has an opening formed therethrough, and wherein the locking mechanism comprises a locking member that is retractably extendable through the opening to maintain the tow bar in a retracted position.

13. The hitch apparatus of claim 12, further comprising a biasing member that compressively biases the locking member toward the tow bar.

14. The hitch apparatus of claim 13, wherein the locking member engages a surface of the tow bar when the locking member is retracted from the opening and the tow bar is extended.

15. The hitch apparatus of claim 12, wherein the locking mechanism comprises a handle that is configured to disengage the locking member from the tow bar in response to user activation.

16. The hitch apparatus of claim 12, further comprising a biasing member configured to urge the tow bar outwardly slightly from the retracted position toward the extended position when the locking member is disengaged from the tow bar.

17. The hitch apparatus of claim 11, wherein the housing comprises opposite front and rear portions, and wherein the locking mechanism is operably secured to the housing rear portion.

18. The hitch apparatus of claim 11, wherein the locking mechanism comprises:
a latching member rotatably mounted to the housing, the latching member including an elongated recess open to receive a rod secured to the tow bar adjacent the proximal end thereof, wherein the latching member rotates from an open rod receiving position to a closed rod retaining position holding the tow bar in the retracted position;
a pawl member rotatably mounted to the housing, the pawl member including a pawling surface for engaging the latching member when the latching member rotates to the closed rod retaining position and holding the latching member in the closed rod retaining position; and
a handle operably connected to the pawl member, wherein the handle, in response to user activation thereof, rotates the pawl member to disengage from the latching member so that the latching member can rotate to the open rod receiving position and release the rod.

19. The hitch apparatus of claim 18, wherein the latching member comprises a portion that engages the rod and urges the tow bar outwardly slightly from the retracted position toward the extended position when the latching member is rotated to the open rod receiving position.

20. The hitch apparatus of claim 18, wherein the guide member is secured to a distal end of the rod.

21. The hitch apparatus of claim 17, further comprising a biasing member configured to urge the tow bar outwardly slightly from the retracted position toward the extended position when the locking mechanism is disengaged from the tow bar.

22. A hitch apparatus, comprising:
a housing configured to be attached to a vehicle, wherein the housing comprises spaced-apart first and second sections that define a cavity, wherein the first section has an elongated slot formed therethrough;
a tow bar guide attached to an interior side of the first section, wherein the tow bar guide has an elongated opening formed therethrough with opposite first and second portions, wherein the first portion is aligned with the first section elongated slot;
a tow bar movably disposed within the housing cavity, wherein the tow bar is movable relative to the housing between retracted and extended positions, and is pivotable relative to the housing when in the extended position, wherein a first guide member extends outwardly from a proximal end of the tow bar and through the first portion of the elongated opening and is operably engaged with the elongated slot in the first section, wherein a second guide member extends outwardly from a medial portion of the tow bar and is operably engaged with the elongated opening second portion, wherein the elongated opening second portion has a configuration that limits an extent to which the tow bar can pivot relative to the housing; and
a locking mechanism operably secured to the housing that releasably engages the tow bar to maintain the tow bar in the retracted position.

23. The hitch apparatus of claim 22, wherein the first and second guide members comprise rollers configured to rotate.

24. The hitch apparatus of claim 22, wherein the elongated opening second portion has a configuration such that an extent to which the tow bar can pivot relative to the housing progressively increases as the tow bar is progressively extended.

25. The hitch apparatus of claim 22, wherein the housing first section is a plate member, and wherein the tow bar guide is a generally planar member that is attached to the interior side of the first section in face-to-face contacting relationship.

26. The hitch apparatus of claim 22, further comprising a biasing member configured to urge the tow bar outwardly slightly from the retracted position toward the extended position when the locking mechanism is disengaged from the tow bar.

27. The hitch apparatus of claim 22, wherein the locking mechanism is configured to urge the tow bar outwardly slightly from the retracted position toward the extended position when the locking mechanism is disengaged from the tow bar.

28. The hitch apparatus of claim 22, wherein the locking mechanism comprises:
  a latching member rotatably mounted to the housing, the latching member including an elongated recess open to receive a rod secured to the tow bar adjacent the proximal end thereof, wherein the latching member rotates from a rod receiving position to a closed rod retaining position holding the tow bar in the retracted position;
  a pawl member rotatably mounted to the housing, the pawl member including a pawling surface for engaging the latching member when the latching member rotates to the closed rod retaining position and holding the latching member in the closed rod retaining position; and
  a handle operably connected to the pawl member, wherein the handle, in response to user activation thereof, rotates the pawl member to disengage from the latching member so that the latching member can rotate and release the rod.

29. A hitch apparatus, comprising:
  a housing configured to be attached to a vehicle, wherein the housing comprises spaced-apart first and second sections that define a cavity, wherein the first and second sections each have an elongated slot formed therethrough;
  a first tow bar guide attached to an interior side of the first section, a second tow bar guide attached to an interior side of the second section, wherein each tow bar guide has an elongated opening formed therethrough with opposite first and second portions, wherein the first portion of the first tow bar guide elongated opening is aligned with the elongated slot in the first section, wherein the first portion of the second tow bar guide elongated opening is aligned with the elongated slot in the second section; and
  a tow bar movably disposed within the housing cavity, wherein the tow bar is movable relative to the housing between retracted and extended positions, and is pivotable relative to the housing when in the extended position, wherein a pair of first guide members extend outwardly from respective opposite upper and lower sides of the tow bar at a proximal end of the tow bar, wherein each first guide member extends through the first portion of the elongated opening in a respective one of the first and second tow bar guides and is operably engaged with the elongated slot in a respective one of the first and second sections, wherein a pair of second guide members extend outwardly from the respective upper and lower sides of the tow bar at a medial portion of the tow bar, wherein each second guide member is operably engaged with the elongated opening second portion of a respective one of the first and second tow bar guides.

30. The hitch apparatus of claim 29, wherein the elongated opening second portion in the first and second tow bar guides has a configuration that limits an extent to which the tow bar can pivot relative to the housing.

31. The hitch apparatus of claim 29, wherein the elongated opening second portion in the first and second tow bar guides has a configuration such that an extent to which the tow bar can pivot relative to the housing progressively increases as the tow bar is progressively extended.

32. The hitch apparatus of claim 29, wherein the pair of first and second guide members comprise rollers configured to rotate.

33. The hitch apparatus of claim 29, wherein the upper and lower sides of the tow bar are in contacting relationship respectively with the first and second tow bar guides as the tow bar is moved between the retracted and extended positions.

34. The hitch apparatus of claim 29, further comprising a locking mechanism operably secured to the housing that releasably engages the tow bar to maintain the tow bar in the retracted position.

35. The hitch apparatus of claim 34, further comprising a biasing member configured to urge the tow bar outwardly slightly from the retracted position toward the extended position when the locking mechanism is disengaged from the tow bar.

36. The hitch apparatus of claim 34, wherein the locking mechanism comprises:
  a latching member rotatably mounted to the housing, the latching member including an elongated recess open to receive a rod secured to the tow bar adjacent the proximal end thereof, wherein the latching member rotates between an open rod receiving position and a closed rod retaining position holding the tow bar in the retracted position;
  a pawl member rotatably mounted to the housing, the pawl member including a pawling surface for engaging the latching member when the latching member rotates to the closed rod retaining position and holding the latching member in the closed rod retaining position; and
  a handle operably connected to the pawl member, wherein the handle, in response to user activation thereof, rotates the pawl member to disengage from the latching member so that the latching member can rotate to the open rod receiving position and release the rod.

37. The hitch apparatus of claim 36, wherein the latching member comprises a portion that engages the rod and urges the tow bar outwardly slightly from the retracted position toward the extended position when the latching member is rotated to the open rod receiving position.

38. A hitch apparatus, comprising:
  a housing configured to be attached to a vehicle, wherein the housing comprises spaced-apart first and second sections that define a cavity;
  a tow bar guide attached to an interior side of the first section, wherein the tow bar guide has an elongated planar configuration with an opening formed therethrough;
  a tow bar movably disposed within the housing cavity, wherein the tow bar is movable relative to the housing between retracted and extended positions, and is pivotable relative to the housing when in the extended position, wherein a guide member extends outwardly from the tow bar and is operably engaged with the tow bar guide opening, wherein the opening has a configuration that limits an extent to which the tow bar can pivot relative to the housing; and
  a locking mechanism operably secured to the housing that releasably engages the tow bar to maintain the tow bar in the retracted position, and wherein the locking mechanism is configured to urge the tow bar outwardly slightly from the retracted position toward the extended position when the locking mechanism is disengaged from the tow bar.

39. The hitch apparatus of claim 38, wherein the guide member comprises a roller configured to rotate.

40. The hitch apparatus of claim 38, wherein the opening has a configuration such that the extent to which the tow bar can pivot relative to the housing progressively increases as the tow bar is progressively extended.

41. The hitch apparatus of claim 38, wherein the tow bar is in contacting relationship with the tow bar guide as the tow bar is moved between the retracted and extended positions.

42. A hitch apparatus, comprising:
a housing configured to be attached to a vehicle, wherein the housing comprises spaced-apart first and second sections that define a cavity;
a first tow bar guide attached to an interior side of the first section, a second tow bar guide attached to an interior side of the second section, wherein each tow bar guide has an opening formed therethrough; and
a tow bar movably disposed within the housing cavity, wherein the tow bar is movable relative to the housing between retracted and extended positions, and is pivotable relative to the housing when in the extended position, wherein a pair of guide members extend outwardly from respective opposite upper and lower sides of the tow bar, wherein each guide member is operably engaged with the opening in a respective one of the first and second tow bar guides, and wherein each opening in the first and second tow bar guides limits an extent to which the tow bar can pivot relative to the housing.

43. The hitch apparatus of claim 42, wherein the opening in the first and second tow bar guides has a configuration such that the extent to which the tow bar can pivot relative to the housing progressively increases as the tow bar is progressively extended.

44. The hitch apparatus of claim 42, wherein the pair of guide members comprise rollers configured to rotate.

45. The hitch apparatus of claim 42, wherein the upper and lower sides of the tow bar are in contacting relationship respectively with the first and second tow bar guides as the tow bar is moved between the retracted and extended positions.

46. The hitch apparatus of claim 42, further comprising a locking mechanism operably secured to the housing that releasably engages the tow bar to maintain the tow bar in the retracted position.

47. The hitch apparatus of claim 46, further comprising a biasing member configured to urge the tow bar outwardly slightly from the retracted position toward the extended position when the locking mechanism is disengaged from the tow bar.

48. The hitch apparatus of claim 46, wherein the locking mechanism comprises:
a latching member rotatably mounted to the housing, the latching member including an elongated recess open to receive a rod secured to the tow bar adjacent a proximal end thereof, wherein the latching member rotates from an open rod receiving position to a closed rod retaining position holding the tow bar in the retracted position;
a pawl member rotatably mounted to the housing, the pawl member including a pawling surface for engaging the latching member when the latching member rotates to the closed rod retaining position and holding the latching member in the closed rod retaining position; and
a handle operably connected to the pawl member, wherein the handle, in response to user activation thereof, rotates the pawl member to disengage from the latching member so that the latching member can rotate to the open rod receiving position and release the rod.

49. The hitch apparatus of claim 48, wherein the latching member comprises a portion that engages the rod and urges the tow bar outwardly slightly from the retracted position toward the extended position when the latching member is rotated to the open rod receiving position.

50. A hitch apparatus, comprising:
a housing configured to be attached to a vehicle, wherein the housing comprises spaced-apart first and second sections that define a cavity;
a tow bar guide attached to an interior side of the first section, wherein the tow bar guide has an elongated planar configuration with a recess formed therein;
a tow bar movably disposed within the housing cavity, wherein the tow bar is movable relative to the housing between retracted and extended positions, and is pivotable relative to the housing when in the extended position, wherein a guide member extends outwardly from the tow bar and is operably engaged with the tow bar guide recess, wherein the recess has a configuration that limits an extent to which the tow bar can pivot relative to the housing; and
a locking mechanism operably secured to the housing that releasably engages the tow bar to maintain the tow bar in the retracted position, wherein the locking mechanism is configured to urge the tow bar outwardly slightly from the retracted position toward the extended position when the locking mechanism is disengaged from the tow bar.

51. The hitch apparatus of claim 50, wherein the guide member comprises a roller configured to rotate.

52. The hitch apparatus of claim 50, wherein the recess has a configuration such that the extent to which the tow bar can pivot relative to the housing progressively increases as the tow bar is progressively extended.

53. The hitch apparatus of claim 50, wherein the tow bar is in contacting relationship with the tow bar guide as the tow bar is moved between the retracted and extended positions.

54. A hitch apparatus, comprising:
a housing configured to be attached to a vehicle, wherein the housing comprises spaced-apart first and second sections that define a cavity, wherein the first section has an elongated slot formed therethrough;
a tow bar guide attached to an interior side of the first section, wherein the tow bar guide has an opening formed therethrough; and
a tow bar movably disposed within the housing cavity, wherein the tow bar is movable relative to the housing between retracted and extended positions, and is pivotable relative to the housing when in the extended position, wherein a first guide member extends outwardly from a proximal end of the tow bar and is operably engaged with the elongated slot in the first section, wherein a second guide member extends outwardly from a medial portion of the tow bar and is operably engaged with the tow bar guide opening, wherein the tow bar guide opening has a configuration that limits an extent to which the tow bar can pivot relative to the housing.

55. The hitch apparatus of claim 54, wherein the first and second guide members comprise a roller configured to rotate.

56. The hitch apparatus of claim 54, wherein the opening has a configuration such that the extent to which the tow bar can pivot relative to the housing progressively increases as the tow bar is progressively extended.

57. The hitch apparatus of claim 54, wherein the tow bar is in contacting relationship with the tow bar guide as the tow bar is moved between the retracted and extended positions.

58. The hitch apparatus of claim 54, further comprising a locking mechanism operably secured to the housing that releasably engages the tow bar to maintain the tow bar in the retracted position.

59. The hitch apparatus of claim 58, wherein the locking mechanism is configured to urge the tow bar outwardly slightly from the retracted position toward the extended position when the locking mechanism is disengaged from the tow bar.

* * * * *

UNITED STATES PATENT AND TRADEMARK OFFICE
CERTIFICATE OF CORRECTION

PATENT NO. : 8,925,954 B2  
APPLICATION NO. : 12/952889  
DATED : January 6, 2015  
INVENTOR(S) : Williams, Jr. et al.

Page 1 of 1

It is certified that error appears in the above-identified patent and that said Letters Patent is hereby corrected as shown below:

In the Claims:
Column 15, Claim 5, Line 16: Please correct "tow bat" to read -- tow bar --

Signed and Sealed this
Sixteenth Day of June, 2015

Michelle K. Lee
*Director of the United States Patent and Trademark Office*